(12) United States Patent
Nakamura et al.

(10) Patent No.: US 11,870,489 B2
(45) Date of Patent: Jan. 9, 2024

(54) S/N RATIO ESTIMATION CIRCUIT, AND ADAPTIVE FILTER CIRCUIT

(71) Applicant: NIPPON TELEGRAPH AND TELEPHONE CORPORATION, Tokyo (JP)

(72) Inventors: Masanori Nakamura, Musashino (JP); Shuto Yamamoto, Musashino (JP); Asuka Matsushita, Musashino (JP); Fukutaro Hamaoka, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

(21) Appl. No.: 17/766,994

(22) PCT Filed: Oct. 9, 2019

(86) PCT No.: PCT/JP2019/039805
§ 371 (c)(1),
(2) Date: Apr. 6, 2022

(87) PCT Pub. No.: WO2021/070280
PCT Pub. Date: Apr. 15, 2021

(65) Prior Publication Data
US 2023/0097193 A1 Mar. 30, 2023

(51) Int. Cl.
*H04B 10/079* (2013.01)
*H04B 17/15* (2015.01)
*H04B 17/336* (2015.01)

(52) U.S. Cl.
CPC ......... *H04B 10/079* (2013.01); *H04B 17/15* (2015.01); *H04B 17/336* (2015.01)

(58) Field of Classification Search
CPC ..... H04B 10/079; H04B 17/15; H04B 17/336
(Continued)

(56) References Cited

U.S. PATENT DOCUMENTS

| 7,076,001 B2* | 7/2006 | Beadle ............. H04B 17/336 375/343 |
| 8,027,409 B2* | 9/2011 | Aziz ............... H04L 25/03057 327/147 |

(Continued)

FOREIGN PATENT DOCUMENTS

| JP | 6206545 B1 | 10/2017 |
| JP | 6315040 B2 | 4/2018 |

*Primary Examiner* — Dalzid E Singh
(74) *Attorney, Agent, or Firm* — Harness, Dickey & Pierce, P.L.C.

(57) ABSTRACT

A tentative decision is made for symbols on the basis of a received signal and a decision threshold, and a tentative decision signal including a sequence of the symbols is output. A scale value indicating a rate of increase or reduction of the received signal or a threshold change rate indicating a degree of change in the decision threshold is updated so that an appearance frequency of each of symbols included in the tentative decision signal matches an appearance frequency of each of symbols in a reference signal obtained by modulating a transmitted signal with a modulation method used in transmission which is shared between a transmitting side and a receiving side, and an SN ratio is calculated using the scale value or the threshold change rate when a degree of agreement between the appearance frequencies is within a predetermined permissible range. When the scale value is updated, a tentative decision is made for the symbols on the basis of the received signal increased or reduced by the updated scale value and the decision threshold, and when the threshold change rate is updated, the tentative decision for the symbols is made on the basis of the (Continued)

received signal and the decision threshold to which the updated threshold change rate is applied.

7 Claims, 23 Drawing Sheets

(58) Field of Classification Search
USPC ............................................................ 398/38
See application file for complete search history.

(56) References Cited

U.S. PATENT DOCUMENTS

| | | | |
|---|---|---|---|
| 8,411,802 B2* | 4/2013 | Kim | H04L 25/0204 370/335 |
| 9,300,436 B2* | 3/2016 | Katayama | H04L 25/03057 |
| 9,425,908 B1* | 8/2016 | Vazhenin | H04B 17/336 |
| 2019/0074903 A1 | 3/2019 | Takamuku et al. | |
| 2019/0132051 A1 | 5/2019 | Onuma et al. | |

* cited by examiner

S/N RATIO ESTIMATION CIRCUIT, AND ADAPTIVE FILTER CIRCUIT

CROSS-REFERENCE TO RELATED APPLICATIONS

This application is a 371 U.S. National Phase of International Application No. PCT/JP2019/039805, filed on Oct. 9, 2019. The entire disclosure of the above application is incorporated herein by reference.

TECHNICAL FIELD

The present invention relates to an SN ratio estimation circuit and an adaptive filter circuit.

BACKGROUND ART

FIG. 23 is a block diagram illustrating the configuration of a digital coherent optical transmission system S. The optical transmission system S includes an optical transmitter 100, an optical receiver 200, and an optical transmission channel 300 that connects the optical transmitter 100 and the optical receiver 200.

In the optical transmitter 100, an encoding unit 101 encodes a bit sequence provided from the exterior using given error correction code. A symbol mapping unit 102 performs symbol mapping by applying a modulation method such as QPSK (Quadrature Phase Shift Keying), QAM (Quadrature Amplitude Modulation), or PAM (Pulse Amplitude Modulation) to the bit sequence encoded by the encoding unit 101.

A waveform shaping unit 103 performs Nyquist filtering and the like on a symbol sequence generated by the symbol mapping unit 102. A digital-analog conversion unit 104 converts a digital signal of the symbol sequence output by the waveform shaping unit 103 into an analog signal. An optical modulation unit 105 converts an electrical signal output by the digital-analog conversion unit 104 into an optical signal.

The optical transmission channel 300 includes an optical fiber 301 and an optical amplifier 302, and transmits optical signals sent by the optical transmitter 100 to the optical receiver 200.

In the optical receiver 200, a coherent detection unit 201 converts the received optical signal into an analog signal of baseband electricity by producing interference between the received optical signal and local oscillation light. An analog-digital converter 202 converts the analog signal output by the coherent detection unit 201 into a digital signal. A wavelength dispersion compensation unit 203 applies digital signal processing, such as FIR (Finite Impulse Response) filtering and frequency domain equalization, to the digital signal output by the analog-digital converter 202 to equalize wavelength dispersion arising in the optical transmission channel 300.

An adaptive equalization unit 204 estimates a time-varying response, e.g., a response to polarization rotation, polarization mode dispersion, and clock phase variation, using an adaptive filter, and dynamically compensates the digital signal output by the wavelength dispersion compensation unit 203.

A demapping unit 205 converts the digital signal, i.e., the symbol sequence, output by the adaptive equalization unit 204 into a bit sequence. A decoding unit 206 performs error correction decoding on the bit sequence output by the demapping unit 205 and outputs the transmitted bit sequence.

When the converting a received signal of a symbol sequence into a bit sequence, the demapping unit 205 may make a soft decision to output a likelihood of the bits of the received signal in accordance with the receiving point. In such a case, to determine the received signal, it is necessary to provide an optimal normalization coefficient for setting the electrical power of the received signal, i.e., the power, to the optimal power. This optimal normalization coefficient is also used when the decoding unit 206 performs error correction on the bit likelihood sequence.

CITATION LIST

Patent Literature

[PTL 1] Japanese Patent No. 6206545
[PTL 2] Japanese Patent No. 6315040

SUMMARY OF THE INVENTION

Technical Problem

However, in order to find the optimal normalization coefficient, the signal to noise (SN) ratio of the received signal (hereinafter referred to as "SNR") is required, and there is a problem in that in order to calculate the SN ratio, it is necessary that the signal be known before being is transmitted to the optical transmission channel 300.

The adaptive filter provided by the adaptive equalization unit 204 is, for example, a decision-oriented adaptive filter based on the MMSE (Minimum Mean Square Error) norm, and in the case of such an adaptive filter, the average power of the output signal from the adaptive filter varies depending on the SN ratio of the optical transmission channel 300. Here, the average power value of the output signal from the adaptive filter is expressed by the following Formula (1).

[Math. 1]

$$\frac{|S|^2}{|S|^2 + \sigma^2} \tag{1}$$

In Formula (1), S represents a reference symbol sequence and σ represents variance of a noise signal. In the case of a decision-oriented adaptive filter based on the MMSE norm, in a low-SN ratio region, the power of the received signal is not optimal, resulting in errors with a threshold used for the decision, and frequent errors in tentative decision output.

For example, the upper graph in FIG. 24 indicates a frequency per amplitude of the output signal of a decision-oriented adaptive filter based on the MMSE norm for each of the three SN ratios. The lower graph in FIG. 24 indicates a frequency per amplitude of output signals tentatively decided on for each of the output signals in the upper graph. Note that PAM8 is employed as the modulation method.

Comparing the SN ratio of 7.2 dB shown in FIG. 24 (c) with the SN ratio of 19.2 dB in FIG. 24(a), when the SN ratio is 7.2 dB, there is error with the threshold used for the decision compared to when the SN ratio is 19.2 dB, and the frequency per amplitude varies in the tentative decision output. There is thus a problem in that in the low-SN ratio region, the filter coefficients diverge because the power converges on a power that is not appropriate, and the step size, which is a parameter related to the convergence speed, cannot be increased.

In light of the foregoing circumstances, an object of the present invention is to provide a technique which makes it possible to find an optimal normalization coefficient so that an accurate tentative decision can be made.

Means for Solving the Problem

One aspect of the present invention is an SN ratio estimation circuit, including: a tentative decision unit that makes a tentative decision for symbols on the basis of a received signal and a decision threshold, and outputs a tentative decision signal including a sequence of the symbols; an updating unit that updates a scale value indicating a rate of increase or reduction of the received signal or updates a threshold change rate indicating a degree of change in the decision threshold so that an appearance frequency of each of symbols included in the tentative decision signal output by the tentative decision unit matches an appearance frequency of each of symbols in a reference signal obtained by modulating a transmitted signal with a modulation method used in transmission, the modulation method being shared between a transmitting side and a receiving side, and that outputs an instruction signal indicating an instruction to calculate an SN ratio of the received signal when a degree of agreement between the appearance frequencies is within a predetermined permissible range; and an SN ratio calculation unit that, when the instruction signal output by the updating unit is received, calculates an SN ratio using the scale value when the instruction signal is received or using the threshold change rate when the instruction signal is received. When the scale value has been updated by the updating unit, the tentative decision unit makes a tentative decision for the symbols on the basis of the received signal increased or reduced by the scale value that has been updated and the decision threshold, and when the threshold change rate has been updated by the updating unit, the tentative decision unit makes a tentative decision for the symbols on the basis of the received signal and the decision threshold to which the threshold change rate that has been updated is applied.

One aspect of the present invention is the above-described SN ratio estimation circuit, wherein the updating unit includes: an average power calculation unit that calculates an average power value of the tentative decision signal output by the tentative decision unit; a decision unit that decides whether or not the degree of agreement between the appearance frequencies is within the predetermined permissible range on the basis of a target power value calculated from the appearance frequency of each symbol in the reference signal and the average power value, and outputs the instruction signal to the SN ratio calculation unit when it is decided that the degree of agreement is within the permissible range; and an update computation unit that updates the scale value or updates the threshold change rate on the basis of the target power value and the average power value when the decision unit decides that the degree of agreement is not within the permissible range.

One aspect of the present invention is the above-described SN ratio estimation circuit, wherein the updating unit includes: a histogram generation unit that generates a histogram indicating the appearance frequency for each symbol included in the tentative decision signal output by the tentative decision unit; a decision unit that, on the basis of error between a histogram of the appearance frequency of each symbol in the reference signal and the histogram generated by the histogram generation unit, decides whether or not the degree of agreement between the appearance frequencies is within a predetermined permissible range, and when it is decided that the degree of agreement is within the permissible range, outputs the instruction signal to the SN ratio calculation unit; and an update computation unit that updates the scale value or updates the threshold change rate so as to reduce the error when the decision unit decides that the degree of agreement is not within the permissible range.

One aspect of the present invention is an adaptive filter circuit, including: a filter unit that filters a received signal on the basis of a filter coefficient; a tentative decision unit that makes a tentative decision for symbols on the basis of the received signal that has been filtered and a decision threshold, and outputs a tentative decision signal including a sequence of the symbols; an updating unit that updates a scale value indicating a rate of increase or reduction of the received signal that has been filtered or updates a threshold change rate indicating a degree of change in the decision threshold so that an appearance frequency of each of the symbols included in the tentative decision signal output by the tentative decision unit matches an appearance frequency of each of symbols in a reference signal obtained by modulating a transmitted signal with a modulation method used in transmission, the modulation method being shared between a transmitting side and a receiving side; and a filter coefficient updating unit that, on the basis of the received signal, the received signal that has been filtered, and the tentative decision signal output by the tentative decision unit, calculates an update value for the filter coefficient, and provides the update value for the filter coefficient that has been calculated to the filter unit. When the scale value is updated by the updating unit, the tentative decision unit makes a tentative decision for the symbols on the basis of the received signal that has been filtered and has been increased or reduced by the scale value that has been updated, and the decision threshold, and when the threshold change rate has been updated by the updating unit, the tentative decision unit makes a tentative decision for the symbols on the basis of the received signal that has been filtered and the decision threshold to which the threshold change rate that has been updated is applied.

One aspect of the present invention is the above-described adaptive filter circuit, wherein the updating unit includes: an average power calculation unit that calculates an average power value of the tentative decision signal output by the tentative decision unit; a decision unit that decides whether or not a degree of agreement between the appearance frequencies is within a predetermined permissible range on the basis of a target power value calculated from the appearance frequency of each of the symbols in the reference signal and the average power value; and an update computation unit that updates the scale value or updates the threshold change rate on the basis of the target power value and the average power value when the decision unit decides that the degree of agreement is not within the permissible range.

One aspect of the present invention is the above-described adaptive filter circuit, wherein the updating unit includes: a histogram generation unit that generates a histogram indicating the appearance frequency for each symbol included in the tentative decision signal output by the tentative decision unit; a decision unit that, on the basis of error between a histogram of the appearance frequency for each of the symbols in the reference signal and the histogram generated by the histogram generation unit, decides whether or not the degree of agreement between the appearance frequencies is within the predetermined permissible range; and an update computation unit that updates the scale value or updates the threshold change rate so as to reduce the error when the decision unit decides that the degree of agreement is not within the permissible range.

One aspect of the present invention is an adaptive filter circuit, including: a filter unit that filters a received signal on the basis of a filter coefficient; a tentative decision unit that makes a tentative decision for symbols on the basis of the received signal that has been filtered and a decision threshold, and outputs a tentative decision signal including a sequence of the symbols; and a filter coefficient updating unit that, on the basis of the received signal, the received signal that has been filtered, and the tentative decision signal output by the tentative decision unit, calculates an update value for the filter coefficient, and provides the update value for the filter coefficient that has been calculated to the filter unit, wherein on the basis of the received signal that has been filtered and has been increased or reduced by the scale value used when the above-described SN ratio estimation circuit takes in the received signal that has been filtered instead of the received signal and calculates the SN ratio, and the decision threshold, or on the basis of the decision threshold to which the threshold change rate used when calculating the SN ratio is applied and the received signal that has been filtered, the tentative decision unit of the adaptive filter circuit makes a tentative decision for the symbols, and outputs a tentative decision signal including a sequence of the symbols.

Effects of the Invention

According to this invention, an optimal normalization coefficient can be found, so that an accurate tentative decision can be made.

DESCRIPTION OF EMBODIMENTS

First Embodiment

Figure 1:
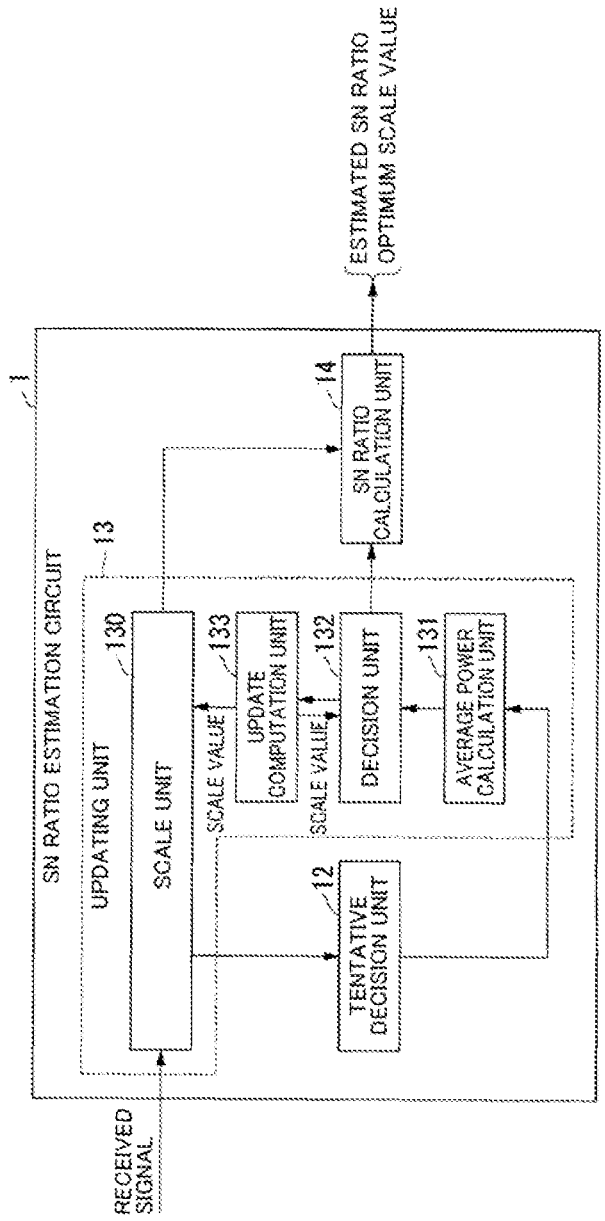
FIG. 1 is a block diagram illustrating the configuration of an SN ratio estimation circuit according to a first embodiment.

Hereinafter, an embodiment of the present invention will be described with reference to the drawings. FIG. 1 is a block diagram illustrating the configuration of an SN ratio estimation circuit 1 of a first embodiment. The SN ratio estimation circuit 1 includes a tentative decision unit 12, an updating unit 13, and an SN ratio calculation unit 14.

The tentative decision unit 12 stores a decision threshold in advance in an internal storage region. For example, in the case of PAM8, the decision threshold includes seven thresholds, such as (−6, −4, −2, 0, 2, 4, 6).

The tentative decision unit 12 takes in a received signal, which is increased or reduced by a scale value r output by a scale unit 130 of the updating unit 13. The tentative decision unit 12 makes a tentative decision on a symbol on the basis of the received signal that has been taken in and the decision threshold stored in the internal storage region. The tentative decision unit 12 outputs a tentative decision signal including a symbol sequence that is a result of the tentative decision.

The updating unit 13 updates the scale value r, which indicates the rate of increase or reduction of the received signal, on the basis of the tentative decision signal output by the tentative decision unit 12. Specifically, the updating unit 13 updates the scale value r, which indicates the rate of increase or reduction of the received signal, so that the appearance frequency of each symbol included in the tentative decision signal matches an appearance frequency of each symbol in a signal obtained by modulating a transmitted signal using a modulation method used during transmission (called a "reference signal" hereinafter), the modulation method being shared in advance between the transmitting side and the receiving side. However, when the transmitted data (bit strings or the like) is random, the appearance frequency of each symbol in the reference signal here does not change unless the modulation method is changed. Accordingly, if the modulation method is shared by the transmitter and receiver, the aforementioned target symbol appearance frequency can be used in a receiver without using a known signal. The updating unit 13 includes the scale unit 130, an average power calculation unit 131, a decision unit 132, and an update computation unit 133. The average power calculation unit 131 squares the tentative decision signal output by the tentative decision unit 12 and calculates an average. The result of this calculation serves as an average power value of the tentative decision signal. The average power value of the tentative decision signal will be referred to as Ptmp hereinafter.

The decision unit 132 decides whether or not a degree of agreement between the appearance frequency of each symbol included in the tentative decision signal and the appearance frequency of each symbol in the reference signal is within a permissible range. The decision unit 132 stores a predetermined target power value (the target power value may also be referred to as "Pref" hereinafter) and a predetermined target ratio in an internal storage region. Here, the target ratio is "1", for example. The target power value is the average power value of the reference signal, i.e., the signal obtained when the transmitted signal is modulated with the modulation method used during transmission, which is shared in advance between the transmitting side and the receiving side. Here, when the transmitted data (bit strings or the like) is random, the average power of the reference signal here does not change unless the modulation method is changed. Accordingly, if the modulation method is shared by the transmitter and receiver, the aforementioned target reference signal average power value can be used in a receiver without using a known signal.

The decision unit 132 decides whether the degree of agreement between the aforementioned appearance frequencies of each symbol is within the permissible range on the basis of a ratio between the target power value and the average power value of the tentative decision signal, i.e., Pref/Ptmp, and the target ratio. For example, when Pref/Ptmp is lower than the target ratio, the decision unit 132 decides that the degree of agreement between the aforementioned appearance frequencies of each symbol is within the permissible range.

When the decision unit 132 has decided that Pref/Ptmp is lower than the target ratio, the newest scale value r received from the update computation unit 133 is taken as an optimum scale value r_opt, and an instruction signal including the optimum scale value r_opt is output to the SN ratio calculation unit 14. If it is decided that Pref/Ptmp is not lower than the target ratio, the decision unit 132 outputs the target power value Pref and the average power value Ptmp of the tentative decision signal to the update computation unit 133.

The update computation unit 133 calculates a new scale value r through the following Formula (2), on the basis of the target power value Pref output by the decision unit 132 and the average power value Ptmp of the tentative decision signal.

[Math. 2]

$$r = \frac{\sqrt{Pref}}{\sqrt{Ptmp}} \quad (2)$$

The update computation unit 133 outputs the calculated new scale value r to the scale unit 130 and the decision unit 132. Additionally, the update computation unit 133 stores a predetermined initial value for the scale value r in an internal storage region. If the target power value Pref from the decision unit 132 and the average power value Ptmp of the tentative decision signal have not been provided, the update computation unit 133 outputs the initial value of the scale value r to the scale unit 130 and the decision unit 132.

The scale unit 130 takes in a received signal provided from the exterior. The received signal provided to the scale unit 130 is, for example, an output signal of the adaptive equalization unit 204 illustrated in FIG. 23. The scale unit 130 multiplies the received signal by the scale value r output by the update computation unit 133 to increase or reduce the electrical power of the received signal, i.e., the power. The scale unit 130 outputs the received signal multiplied by the scale value r to the tentative decision unit 12 and the SN ratio calculation unit 14.

The SN ratio calculation unit 14 stores the target power value Pref in an internal storage region. The SN ratio calculation unit 14 takes in the instruction signal, output by the decision unit 132, that instructs the SN ratio to be calculated. The SN ratio calculation unit 14 calculates the value of the average power of the received signal output by the scale unit 130 when the instruction signal is taken in, i.e., the received signal multiplied by the optimum scale value r_opt. In the following, the average power value of the received signal multiplied by the optimum scale value r_opt is also referred to as "Prx_opt". The SN ratio calculation unit 14 calculates SNR_est, which is an estimated SN ratio, using the following Formula (3).

[Math. 3]

$$SNR\_est = \frac{Pref}{Prx\_opt - Pref} \quad (3)$$

Here, the optimum scale value r_opt is a scale value that minimizes a symbol error rate when the tentative decision unit 12 makes a tentative decision on a symbol at a predetermined decision threshold. For example, the average power value of the transmitted signal is represented by Ps, the average power value of noise added by the optical transmission channel is represented by Pn, and the average power value of the received signal multiplied by the scale value r is represented by Pr. In this case, the scale value r when Pr=Ps+Pn holds true is the optimum scale value r_opt. Therefore, as Pn becomes larger, the optimum scale value r_opt also becomes larger. Also, since the SN ratio is expressed as Ps/Pn, the smaller the SN ratio is, the larger the optimum scale value r_opt becomes. In other words, the optimum scale value r_opt will be different depending on the SN ratio of the received signal.

In reality, the receiving side of an optical signal has Auto Power Control function and the like. As such, the input power is kept constant regardless of the SN ratio, the power fluctuates due to attenuation caused by loss in optical lines and electrical lines or normalization in analog-digital conversion or digital signal processing, or the like. Since the SN ratio does not change even when such power fluctuations occur, the optimum scale value r_opt can be calculated in reverse if the SN ratio can be estimated accurately.

For example, Pr' represents the average power value of the received signal that is actually received. Pr' is a value corresponding to Ptmp mentioned above. At this time, the optimum scale value r_opt can be calculated by the following Formula (4).

[Math. 4]

$$r\_opt = \sqrt{\frac{Pr}{Pr'}} \quad (4)$$

As mentioned above, Pr=Ps+Pn, and the average power value Ps of the transmitted signal is a value that can be calculated from the statistical properties of the transmitted signal as long as the modulation method used in the transmission is known. The average power value Ps of the transmitted signal is equivalent to the target power value Pref mentioned above. The average power value Pn of the noise can be calculated as Pn=Ps/SNR if the SN ratio can be estimated. Therefore, the optimum scale value r_opt can be expressed through the following Formula (5).

[Math. 5]

$$r\_opt = \sqrt{\left(Ps + \frac{Ps}{SNR}\right)/Pr'} = \sqrt{\frac{Ps}{Pr'}\left(1 + \frac{1}{SNR}\right)} \quad (5)$$

From Formula (5), it can be seen that the optimum scale value r_opt varies depending on the average power value Pr' of the received signal that is actually received and the SN ratio. Therefore, the estimated SN ratio can be calculated through Formula (3) by updating the scale value r according to Formula (2) and taking the scale value r when Pref/Ptmp is lower than the target ratio as the optimum scale value r_opt.

Processing by SN Ratio Estimation Circuit According to First Embodiment

Figure 2:
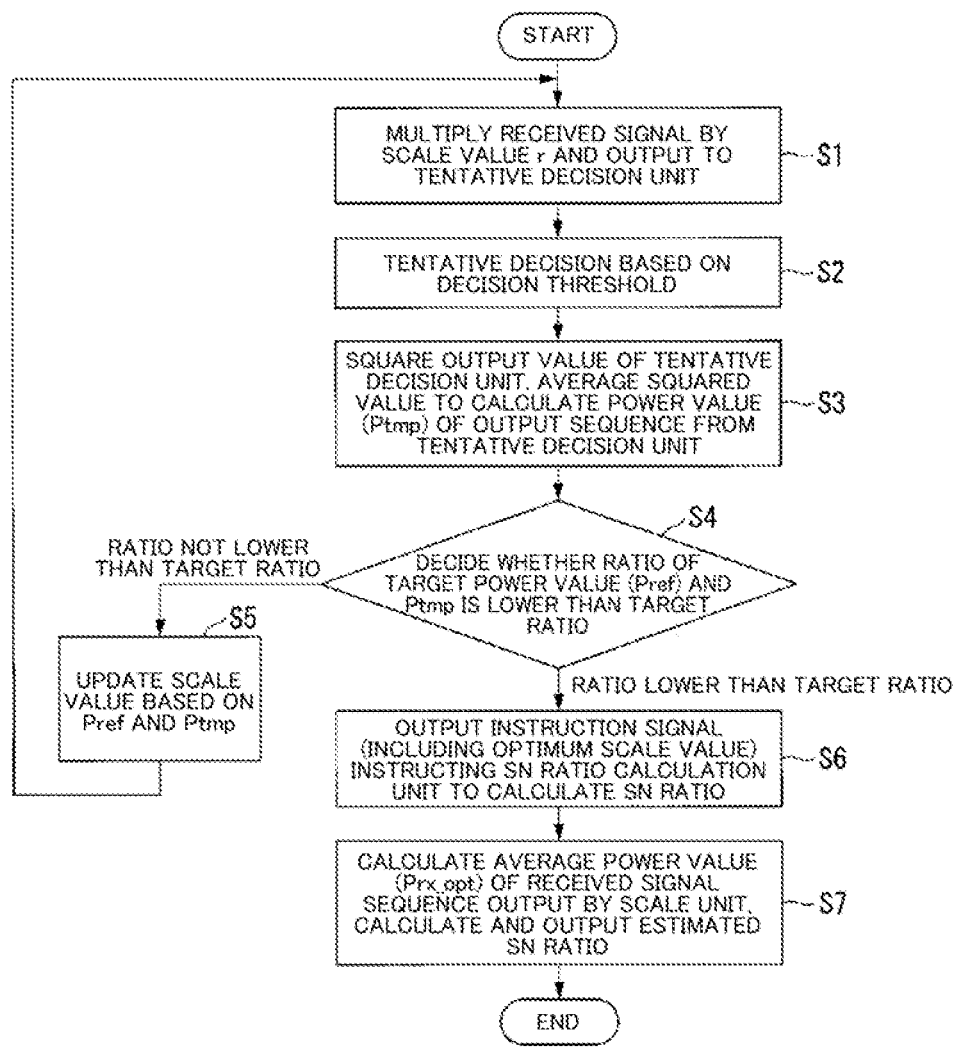
FIG. 2 is a flowchart illustrating the flow of processing by the SN ratio estimation circuit according to the first embodiment.

FIG. 2 is a flowchart illustrating the flow of processing by the SN ratio estimation circuit 1 of the first embodiment. The scale unit 130 takes in the scale value r output by the update computation unit 133. The scale unit 130 takes in the received signal provided from the exterior. The scale unit 130 multiplies the received signal which has been taken in by the scale value r and outputs the result of the multiplication to the tentative decision unit 12 (step S1). Note that if the target power value Pref from the decision unit 132 and the average power value Ptmp of the tentative decision signal have not been provided, the update computation unit 133 outputs the initial value of the scale value r to the scale unit 130.

The tentative decision unit 12 makes a tentative decision on a symbol, for the received signal multiplied by the scale value r, on the basis of the decision threshold stored in the internal storage region. The tentative decision unit 12 outputs a tentative decision signal including a detected symbol sequence (step S2).

The average power calculation unit 131 squares the tentative decision signal output by the tentative decision unit 12 and finds an average to calculate the average power value (Ptmp) of the tentative decision signal (step S3). The average power calculation unit 131 outputs the calculated average power value (Ptmp) of the tentative decision signal to the decision unit 132.

The decision unit 132 takes in the average power value (Ptmp) of the tentative decision signal output by the average power calculation unit 131 and calculates a ratio to the target power value (Pref) stored in the internal storage region. In other words, the decision unit 132 calculates Pref/Ptmp. The decision unit 132 determines whether the calculated Pref/Ptmp is lower than the target ratio stored in the internal storage region (step S4).

If it is decided that Pref/Ptmp is not lower than the target ratio ("ratio not lower than target ratio" in step S4), the decision unit 132 outputs the target power value Pref and the average power value Ptmp of the tentative decision signal to the update computation unit 133.

The update computation unit 133 takes in the target power value Pref output by the decision unit 132 and the average power value Ptmp of the tentative decision signal. The update computation unit 133 calculates a new scale value r through Formula (2), on the basis of the target power value Pref and the average power value Ptmp of the tentative decision signal that have been taken in (step S5). The update computation unit 133 outputs the calculated new scale value r to the scale unit 130 and the decision unit 132, and the processing from step S1 and on is performed.

On the other hand, if it is decided that Pref/Ptmp is lower than the target ratio ("ratio lower than target ratio" in step S4), the decision unit 132 outputs an instruction signal instructing the SN ratio to be calculated to the SN ratio calculation unit 14 (step S6).

The scale value r when Pref/Ptmp has become lower than the target ratio is the optimum scale value r_opt. When outputting the instruction signal in step S6, the decision unit 132 takes the newest scale value r received from the update computation unit 133 as the optimum scale value r_opt, and outputs the optimum scale value r_opt, included in the instruction signal, to the SN ratio calculation unit 14.

The SN ratio calculation unit 14 takes in the received signal output by the scale unit 130. The received signal output by the scale unit 130 when the SN ratio calculation unit 14 takes in the instruction signal is the received signal multiplied by the optimum scale value r_opt. The SN ratio calculation unit 14 calculates the average power value Prx_opt by squaring the received signal that has been taken in and finding an average.

The SN ratio calculation unit 14 calculates the estimated SN ratio (SNR_est) through Formula (3) on the basis of the target power value Pref stored in the internal storage region and the calculated average power value Prx_opt. The SN ratio calculation unit 14 outputs the optimum scale value r_opt included in the instruction signal and the calculated estimated SN ratio (SNR_est) to the exterior (step S7).

Figure 23:
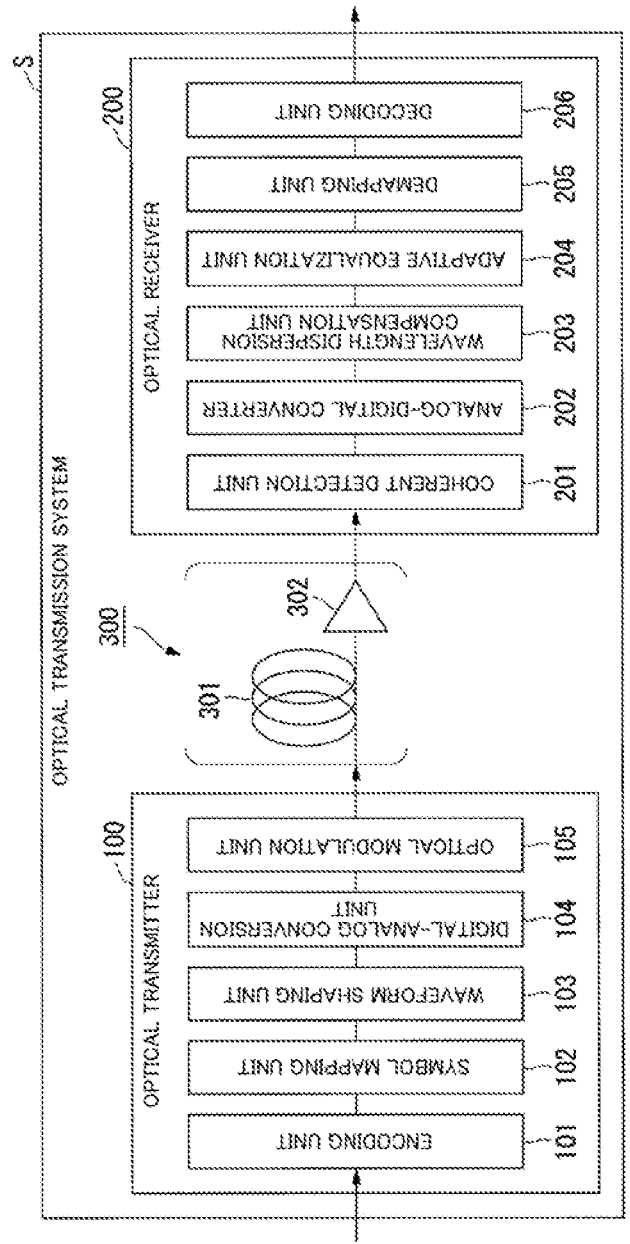
FIG. 23 is a block diagram illustrating the configuration of a digital coherent optical transmission system.
Figure 24:
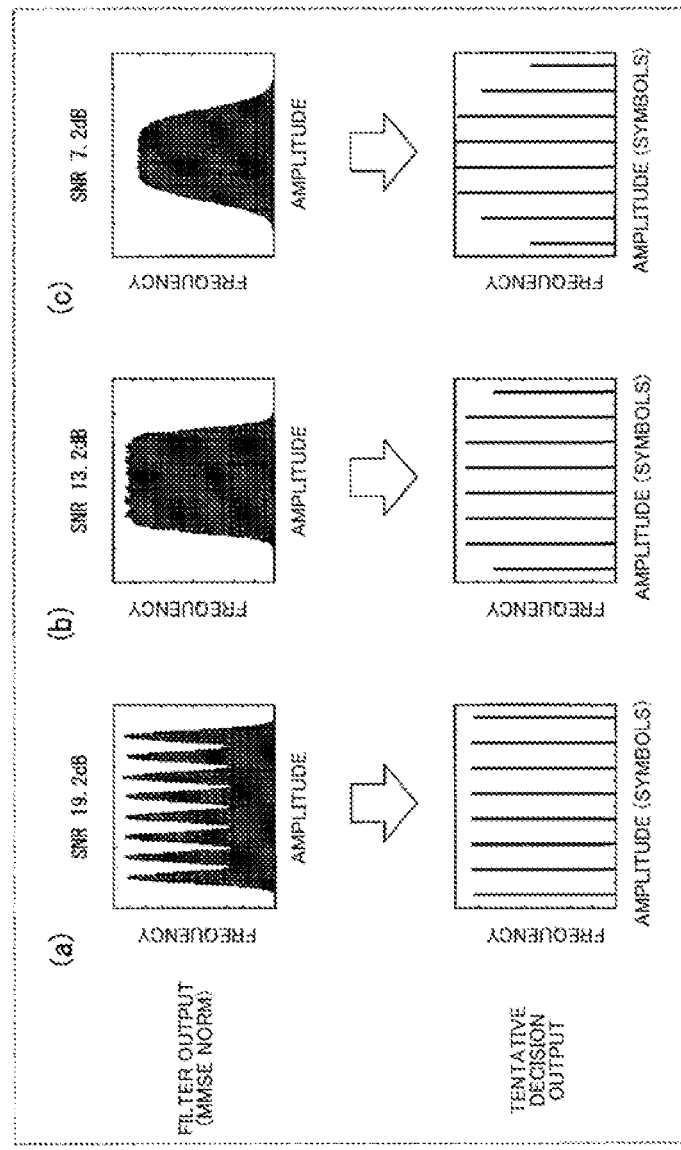
FIG. 24 is a diagram illustrating a relationship between the filter output of a decision-oriented adaptive filter and a tentative decision output.

For example, the SN ratio calculation unit 14 outputs the optimum scale value r_opt and the estimated SN ratio (SNR_est) to the demapping unit 205, the decoding unit 206, or the like illustrated in FIG. 23. The demapping unit 205 takes the optimum scale value r_opt output by the SN ratio calculation unit 14 as an optimum normalization coefficient and performs demapping using this optimum normalization coefficient and the estimated SN ratio (SNR_est). Additionally, the decoding unit 206 takes the optimum scale value r_opt output by the SN ratio calculation unit 14 as the optimum normalization coefficient and performs error correction decoding using this optimum normalization coefficient and the estimated SN ratio (SNR_est).

In the first embodiment described thus far, the update computation unit 133 calculates a new scale value on the basis of Formula (2), but for example, the new scale value r may be calculated using the following Formula (6) using a step size u in which is u>0. As a result, the range of change in the scale value r becomes smaller, which makes it possible to specify a more optimum scale value r.

[Math. 6]

$$r = u \times \frac{\sqrt{Pref}}{\sqrt{Ptmp}} \quad (6)$$

In the SN ratio estimation circuit 1 of the first embodiment described thus far, the tentative decision unit 12 makes a tentative decision on symbols on the basis of the received signal and the decision threshold, and outputs a tentative decision signal including a sequence of symbols. The updating unit 13 updates the scale value r, which indicates the rate of increase or reduction of the received signal, so that the appearance frequency of each symbol included in the tentative decision signal output by the tentative decision unit 12 matches the appearance frequency of each symbol in the reference signal, and when the degree of agreement between the appearance frequencies is within a predetermined permissible range, outputs an instruction signal indicating an instruction to calculate the SN ratio of the received signal. Upon receiving the instruction signal output by the updating unit 13, the SN ratio calculation unit 14 calculates the SN ratio using the scale value r from when the instruction signal is received. Additionally, the tentative decision unit 12 makes a tentative decision on the symbol on the basis of the received signal, which is increased or reduced by the updated scale value r, and the decision threshold.

To describe this in more detail, the updating unit 13 includes the average power calculation unit 131, the decision unit 132, and the update computation unit 133. The average power calculation unit 131 calculates the average power value Ptmp of the tentative decision signal output by the tentative decision unit 12. The decision unit 132 decides whether the degree of agreement between the appearance frequencies is within the predetermined permissible range on the basis of the target power value Pref, which is calculated from the appearance frequency of each symbol in the reference signal, and the average power value Ptmp. Then, when the decision unit 132 decides that the degree of agreement between the appearance frequencies is within the predetermined permissible range, the instruction signal is output to the SN ratio calculation unit 14. The update computation unit 133 updates the scale value r on the basis of the target power value Pref and the average power value Ptmp when the decision unit 132 has decided that the degree of agreement between the appearance frequencies is not within the predetermined permissible range. This makes it possible to make the tentative decision with good accuracy. Because the tentative decision can be made with good accuracy, the optimum scale value r_opt, i.e., the optimum normalization coefficient can be found. Additionally, the SN ratio can be estimated without using a known signal. This makes it possible to perform demapping and error correction accurately on the receiving side.

Second Embodiment

Figure 3:
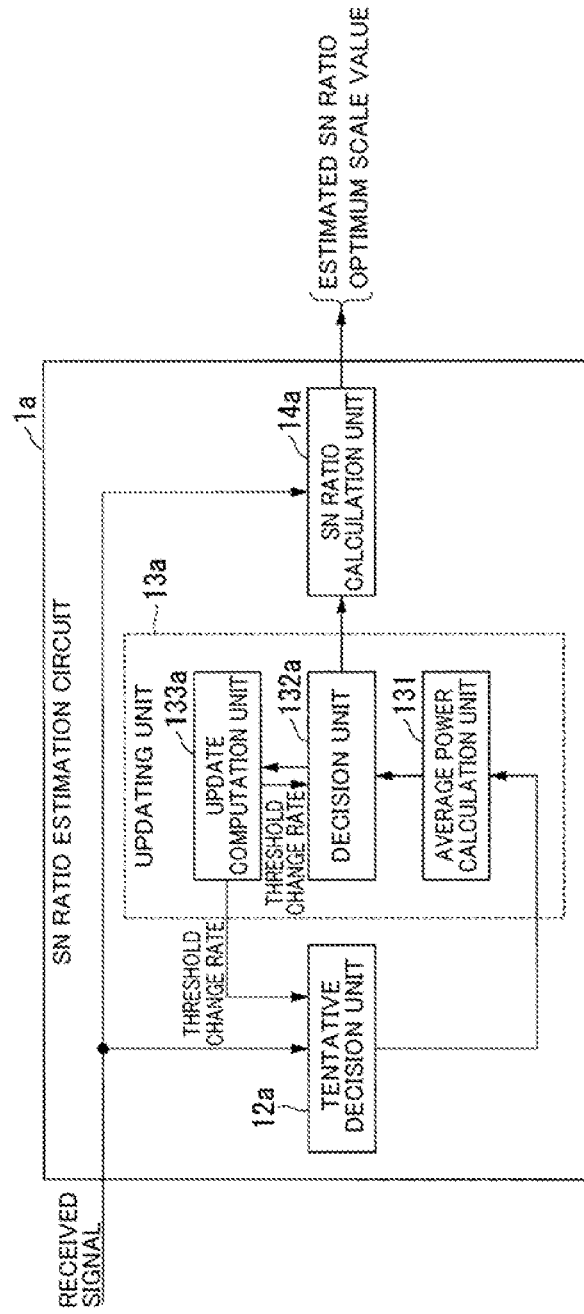
FIG. 3 is a block diagram illustrating the configuration of an SN ratio estimation circuit according to a second embodiment.

FIG. 3 is a block diagram illustrating the configuration of an SN ratio estimation circuit 1*a* of a second embodiment. In FIG. 3, configurations that are the same as in the SN ratio estimation circuit 1 of the first embodiment are given the same reference signs, and the configurations which are different will be described hereinafter. The SN ratio estimation circuit 1*a* includes a tentative decision unit 12*a*, an updating unit 13*a*, and an SN ratio calculation unit 14*a*.

The tentative decision unit 12*a* stores a decision threshold in advance in an internal storage region. For example, in the case of PAM8, the decision threshold includes seven thresholds, such as (−6, −4, −2, 0, 2, 4, 6). The tentative decision unit 12*a* takes in the received signal provided from the exterior. The received signal provided to the tentative decision unit 12*a* is, for example, an output signal of the adaptive equalization unit 204 illustrated in FIG. 23.

The tentative decision unit 12*a* also takes in a threshold change rate b output by an update computation unit 133*a* of the updating unit 13*a*. The tentative decision unit 12*a* multiplies the threshold change rate b that has been taken in by a threshold included in a decision threshold stored in an internal storage region. For example, if the threshold change rate b is "0.8", the decision threshold is (−4.8, −3.2, −1.6, 0, 1.6, 3.2, 4.8). The tentative decision unit 12*a* makes a tentative decision on the symbols on the basis of the received signal that has been taken in and the decision threshold to which the threshold change rate b has been applied, and outputs a tentative decision signal including a symbol sequence, which is the result of the tentative decision.

The updating unit 13*a* updates the threshold change rate b, which indicates a degree of change in the decision threshold, so that the appearance frequency of each symbol included in the tentative decision signal output by the tentative decision unit 12*a* matches the appearance frequency of each symbol in the reference signal. The updating unit 13*a* includes the average power calculation unit 131, a decision unit 132*a*, and the update computation unit 133*a*.

The decision unit 132*a* decides whether or not a degree of agreement between the appearance frequency of each symbol included in the tentative decision signal and the appearance frequency of each symbol in the reference signal is within a permissible range. Like the decision unit 132 of the first embodiment, the decision unit 132*a* stores the target power value Pref and the target ratio in an internal storage region. The target ratio is, for example, "1", as in the first embodiment.

The decision unit 132*a* decides whether the degree of agreement between the aforementioned appearance frequencies of each symbol is within the permissible range on the basis of a ratio between the target power value and the average power value of the tentative decision signal, i.e., Pref/Ptmp, and the target ratio. For example, when Pref/Ptmp is lower than the target ratio, the decision unit 132*a* decides that the degree of agreement between the aforementioned appearance frequencies of each symbol is within the permissible range.

If the decision unit 132*a* determines that Pref/Ptmp is lower than the target ratio, the newest threshold change rate b received from the update computation unit 133*a* is set as an optimum threshold change rate b_opt. The decision unit 132*a* then outputs an instruction signal including the optimum threshold change rate b_opt to the SN ratio calculation unit 14*a*. If it is decided that Pref/Ptmp is not lower than the target ratio, the decision unit 132*a* outputs the target power value Pref and the average power value Ptmp of the tentative decision signal to the update computation unit 133a.

The update computation unit 133a updates the decision threshold so that "a" in the following Formula (7) approaches 1, on the basis of the target power value Pref output by the decision unit 132a and the average power value Ptmp of the tentative decision signal.

[Math. 7]

$$a = \frac{\sqrt{Pref}}{\sqrt{Ptmp}} \quad (7)$$

For example, if a number of updates is set to "t", the update computation unit 133a calculates a threshold change rate b_(t) for a tth time through the following Formula (8).

[Math. 8]

$$b\_(t) = b\_(t-1) \times v \times a \quad (8)$$

In Formula (8), b_(t−1) is the threshold change rate for the t−1th time, and v is, for example, v>0. Note that v can be set to 1>v>0 to suppress large fluctuations caused by control.

The update computation unit 133a outputs the calculated new threshold change rate b to the tentative decision unit 12a and the decision unit 132a. Additionally, the update computation unit 133a stores a predetermined initial value for the threshold change rate b in an internal storage region. If the target power value Pref from the decision unit 132a and the average power value Ptmp of the tentative decision signal have not been provided, the update computation unit 133a outputs the initial value of the threshold change rate b to the tentative decision unit 12a and the decision unit 132a.

The SN ratio calculation unit 14a stores the target power value Pref in an internal storage region. The SN ratio calculation unit 14a takes in the instruction signal, output by the decision unit 132a, that instructs the SN ratio to be calculated. The SN ratio calculation unit 14a reads out the optimum threshold change rate b_opt included in the instruction signal that has been taken in. The SN ratio calculation unit 14a takes in the received signal provided from the exterior. The SN ratio calculation unit 14a multiplies the received signal that has been taken in by the inverse of the optimum threshold change rate b_opt. Here, the inverse of the optimum threshold change rate b_opt is the optimum scale value r_opt in the first embodiment.

The SN ratio calculation unit 14a calculates the value of the average power of the received signal multiplied by the inverse of the optimum threshold change rate b_opt. The average power value of the received signal multiplied by the inverse of the optimum threshold change rate b_opt can be called the average power value of the received signal multiplied by the optimum scale value r_opt described in the first embodiment. As such, the average power value of the received signal multiplied by the inverse of the optimum threshold change rate b_opt will also be referred to as Prx_opt hereinafter. The SN ratio calculation unit 14a calculates SNR_est, which is the estimated SN ratio, using Formula (3).

Processing by SN Ratio Estimation Circuit According to Second Embodiment

Figure 4:
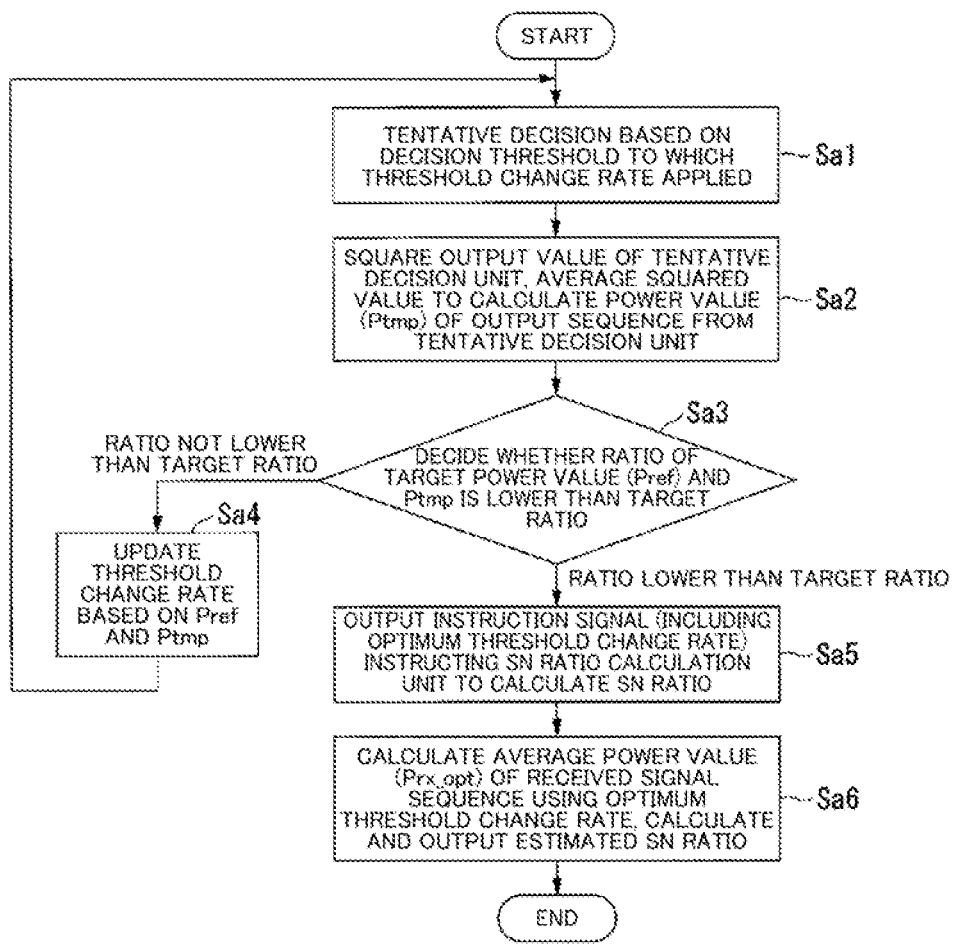
FIG. 4 is a flowchart illustrating the flow of processing by the SN ratio estimation circuit according to the second embodiment.

FIG. 4 is a flowchart illustrating the flow of processing by the SN ratio estimation circuit 1a of the second embodiment. The tentative decision unit 12a takes in the threshold change rate b output by the update computation unit 133a. The tentative decision unit 12a multiplies each of the thresholds included in the decision threshold stored in the internal storage region by the threshold change rate b.

The tentative decision unit 12a makes a tentative decision on the symbols on the basis of the received signal that has been taken in and the decision threshold to which the threshold change rate b has been applied (step Sa1). The tentative decision unit 12a outputs a tentative decision signal including a symbol sequence that is a result of the tentative decision. Note that if the target power value Pref from the decision unit 132a and the average power value Ptmp of the tentative decision signal have not been provided, the update computation unit 133a outputs the initial value of the threshold change rate b to the tentative decision unit 12a.

In step Sa2 and step Sa3, the same processing as that of step S3 and step S4 in FIG. 2 is performed by the average power calculation unit 131 and the decision unit 132a.

If it is decided that Pref/Ptmp is not lower than the target ratio ("ratio not lower than target ratio" in step Sa3), the decision unit 132a outputs the target power value Pref and the average power value Ptmp of the tentative decision signal to the update computation unit 133a. The update computation unit 133a calculates a new threshold change rate b through Formula (8), using the target power value Pref and the average power value Ptmp of the tentative decision signal (step Sa4). The update computation unit 133a outputs the calculated new threshold change rate b to the tentative decision unit 12a and the decision unit 132a, after which the processing of steps Sa1 and on is performed.

On the other hand, if it is decided that Pref/Ptmp is lower than the target ratio ("ratio lower than target ratio" in step Sa3), the decision unit 132a outputs an instruction signal, instructing the SN ratio to be calculated, to the SN ratio calculation unit 14a (step Sa5).

The threshold change rate b when Pref/Ptmp has become lower than the target ratio is the optimum threshold change rate b_opt. When outputting the instruction signal in step Sa5, the decision unit 132a takes the newest threshold change rate b received from the update computation unit 133a as the optimum threshold change rate b_opt, and outputs the optimum threshold change rate b_opt, included in the instruction signal, to the SN ratio calculation unit 14a.

Figure 5:
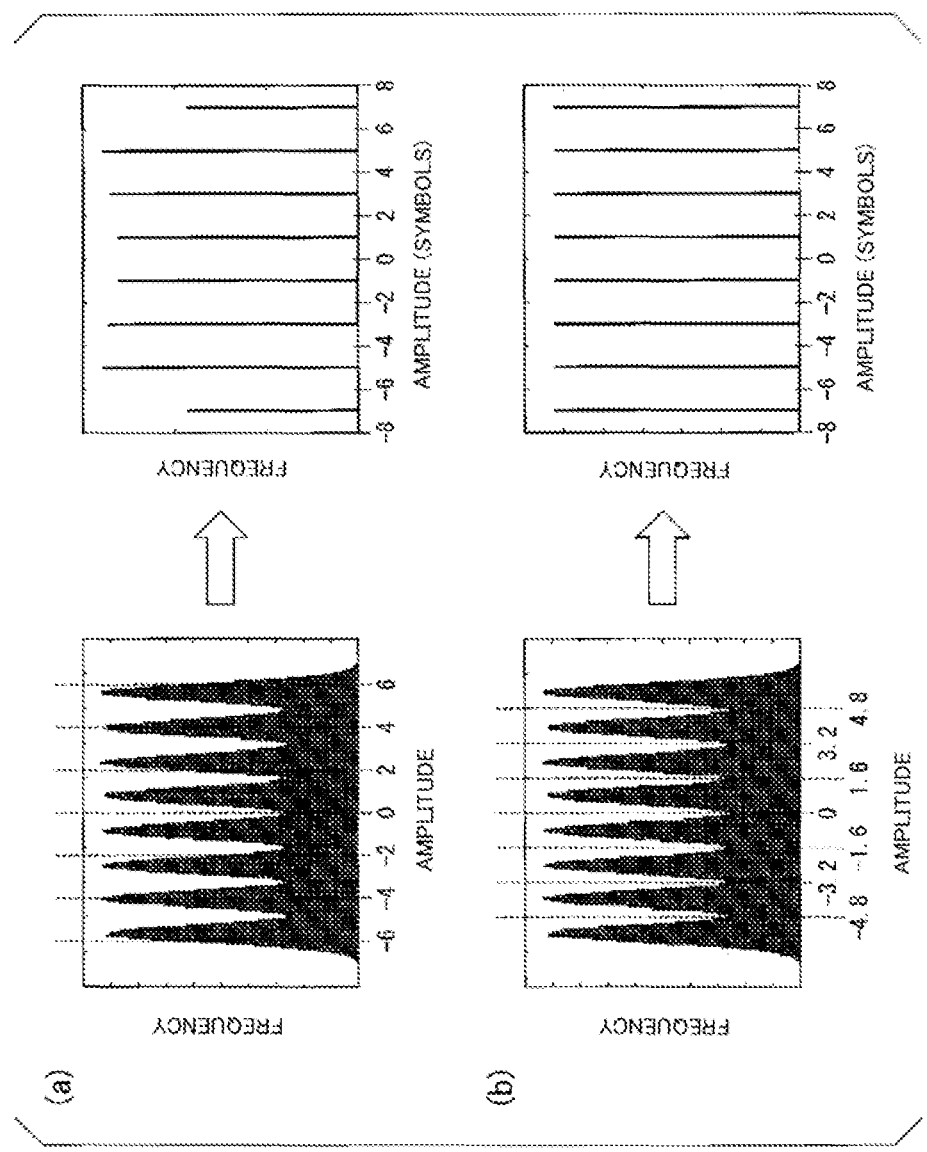
FIG. 5 is a diagram illustrating a change in a decision threshold and a change in a histogram according to the second embodiment.

For example, FIG. 5 illustrates a result of the tentative decision made by the tentative decision unit 12a using the decision threshold to which the threshold change rate b of the initial value is applied and the decision threshold to which the optimum threshold change rate b_opt is applied. The example illustrated in FIG. 5 is an example of when the modulation method shared in advance between the transmitting side and the receiving side is PAM8. Here, the appearance frequency of each symbol in the signal obtained by modulating the transmitted signal using PAM8, i.e., the reference signal, is assumed to be constant.

FIG. 5(a) illustrates a case where the threshold change rate b of the initial value is applied, and FIG. 5(b) illustrates a case where the optimum threshold change rate b_opt is applied. Here, as an example, the optimum threshold change rate b_opt is set to "0.8". The graphs on the left side of FIGS. 5(a) and (b) are histograms showing the frequencies for each amplitude of the received signal taken in from the exterior by the tentative decision unit 12a, and are identical graphs.

In the graphs on the left side of FIGS. 5(a) and (b), each of the seven straight broken lines in the vertical direction represents a corresponding one of the thresholds included in the decision threshold. In FIG. 5(b), the optimum threshold change rate b_opt is applied. As such, the threshold interval is narrower in FIG. 5(b) than in FIG. 5(a).

The graphs on the right side of FIGS. 5(a) and (b) are histograms showing the frequency of each amplitude included in the tentative decision signal output by the tentative decision unit 12a, i.e., the appearance frequency for each symbol. As indicated in FIG. 5(a), when the threshold change rate b of the initial value is applied, there is a variation in the frequency for each amplitude. In contrast, as indicated in FIG. 5(b), when the optimum threshold change rate b_opt is applied, the frequency for each symbol is constant. Accordingly, the appearance frequency for each symbol of the reference signal, i.e., the signal obtained by modulating the transmitted signal using a modulation method that is shared in advance between the transmitting side and the receiving side, i.e., PAM8, will match.

The SN ratio calculation unit 14a takes in the instruction signal, output by the decision unit 132a, that instructs the SN ratio to be calculated. The SN ratio calculation unit 14a then reads out the optimum threshold change rate b_opt included in the instruction signal that has been taken in. The SN ratio calculation unit 14a takes in the received signal provided from the exterior. The SN ratio calculation unit 14a then multiplies the received signal that has been taken in by the inverse of the optimum threshold change rate b_opt.

The SN ratio calculation unit 14a calculates the value Prx_opt of the average power of the received signal multiplied by the inverse of the optimum threshold change rate b_opt. The SN ratio calculation unit 14a calculates SNR_est, which is the estimated SN ratio, through Formula (3), using the average power value Prx_opt. The SN ratio calculation unit 14a outputs the inverse of the optimum threshold change rate b_opt included in the instruction signal, i.e., the optimum scale value r_opt, and the calculated estimated SN ratio (SNR_est) to the exterior (step Sa6).

For example, the SN ratio calculation unit 14a outputs the optimum scale value r_opt and the estimated SN ratio (SNR_est) to the demapping unit 205, the decoding unit 206, or the like illustrated in FIG. 23. The demapping unit 205 takes the optimum scale value r_opt output by the SN ratio calculation unit 14a as the optimum normalization coefficient. The demapping unit 205 uses this optimum normalization coefficient and the estimated SN ratio (SNR_est) to perform demapping. Additionally, the decoding unit 206 takes the optimum scale value r_opt output by the SN ratio calculation unit 14a as the optimum normalization coefficient. The decoding unit 206 uses this optimum normalization coefficient and the estimated SN ratio (SNR_est) to perform error correction decoding.

In the SN ratio estimation circuit 1a of the second embodiment described thus far, the tentative decision unit 12a makes a tentative decision on symbols on the basis of the received signal and the decision threshold, and outputs a tentative decision signal including a sequence of symbols. The updating unit 13a updates the threshold change rate b, which indicates the degree of change of the decision threshold, so that the appearance frequency of each symbol included in the tentative decision signal output by the tentative decision unit 12a matches the appearance frequency of each symbol in the reference signal, and when the degree of agreement between the appearance frequencies is within a predetermined permissible range, outputs an instruction signal indicating an instruction to calculate the SN ratio of the received signal. Upon receiving the instruction signal output by the updating unit 13a, the SN ratio calculation unit 14a calculates the SN ratio using the threshold change rate b from when the instruction signal is received. Additionally, the tentative decision unit 12a makes a tentative decision on the symbols on the basis of the received signal and the decision threshold to which the updated threshold change rate b has been applied.

To describe this in more detail, the updating unit 13a includes the average power calculation unit 131, the decision unit 132a, and the update computation unit 133a. The average power calculation unit 131 calculates the average power value Ptmp of the tentative decision signal output by the tentative decision unit 12a. The decision unit 132a decides whether the degree of agreement between the appearance frequencies is within the predetermined permissible range on the basis of the target power value Pref, which is calculated from the appearance frequency of each symbol in the reference signal, and the average power value Ptmp. Then, if it is decided that the degree of agreement is within the permissible range, the decision unit 132a outputs the instruction signal to the SN ratio calculation unit 14a. If the decision unit 132a has decided that the degree of agreement is not within the permissible range, the update computation unit 133a updates the threshold change rate b on the basis of the target power value (Pref) and the average power value (Ptmp). This makes it possible to make the tentative decision with good accuracy. The tentative decision can therefore be made with good accuracy. Accordingly, the optimum scale value r_opt, which is the inverse of the optimum threshold change rate b_opt, i.e., the optimum normalization coefficient, can be found, and thus the SN ratio can be estimated without using a known signal. This makes it possible to perform demapping and error correction accurately on the receiving side.

Third Embodiment

Figure 6:
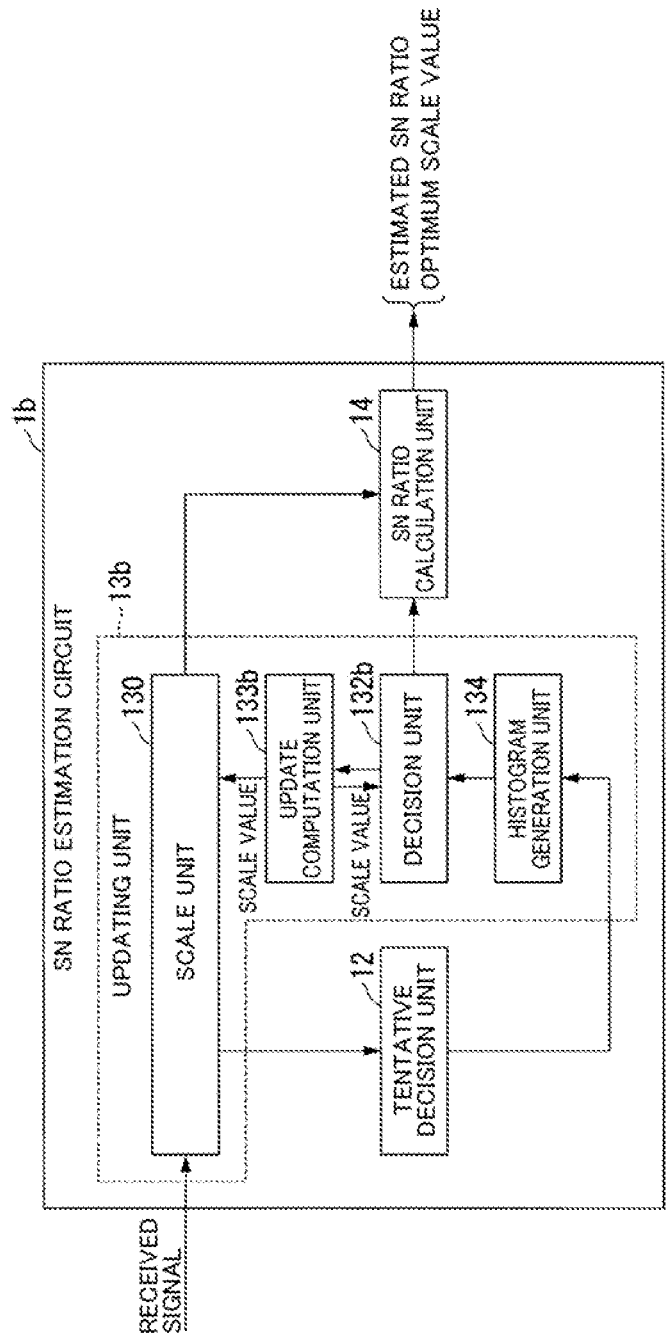
FIG. 6 is a block diagram illustrating the configuration of an SN ratio estimation circuit according to a third embodiment.

FIG. 6 is a block diagram illustrating the configuration of an SN ratio estimation circuit 1b of a third embodiment. In FIG. 6, configurations that are the same as in the SN ratio estimation circuit 1 of the first embodiment are given the same reference signs, and the configurations which are different will be described hereinafter. The SN ratio estimation circuit 1b includes the tentative decision unit 12, an updating unit 13b, and the SN ratio calculation unit 14.

The updating unit 13b updates the scale value r, which indicates a rate of increase or reduction of the received signal, so that the appearance frequency of each symbol included in the tentative decision signal output by the tentative decision unit 12 matches the appearance frequency of each symbol in the reference signal. The updating unit 13b includes a histogram generation unit 134, a decision unit 132b, and an update computation unit 133b. The histogram generation unit 134 generates a histogram indicating the frequency for each amplitude, i.e., the appearance frequency for each symbol, on the basis of the tentative decision signal output by the tentative decision unit 12.

The decision unit 132b decides whether or not a degree of agreement between the appearance frequency of each symbol included in the tentative decision signal and the appearance frequency of each symbol in the reference signal is within a permissible range. The decision unit 132b shares, using a transmitter and receiver, a signal obtained by modulating the transmitted signal using a modulation method used during transmission, which is shared in advance between the transmitting side and the receiving side, i.e., a histogram indicating the appearance frequency for each symbol in the reference signal (this histogram will be called a "transmission histogram" hereinafter), through the internal storage region. At this time, if a modulated signal is generated on the basis of a reference signal having random data of a sufficient length (bit string) and a histogram is then created, there is no longer any need to share random data (bit strings) during transmission and reception. The transmission histogram generated on the transmitter side may also be shared with the receiver side on a separate low-speed line (communication channel, network OpS, or the like).

The decision unit 132b calculates error of the two histograms on the basis of the histogram of the tentative decision signal output by the histogram generation unit 134 and the transmission histogram stored in the internal storage region.

Figure 7:
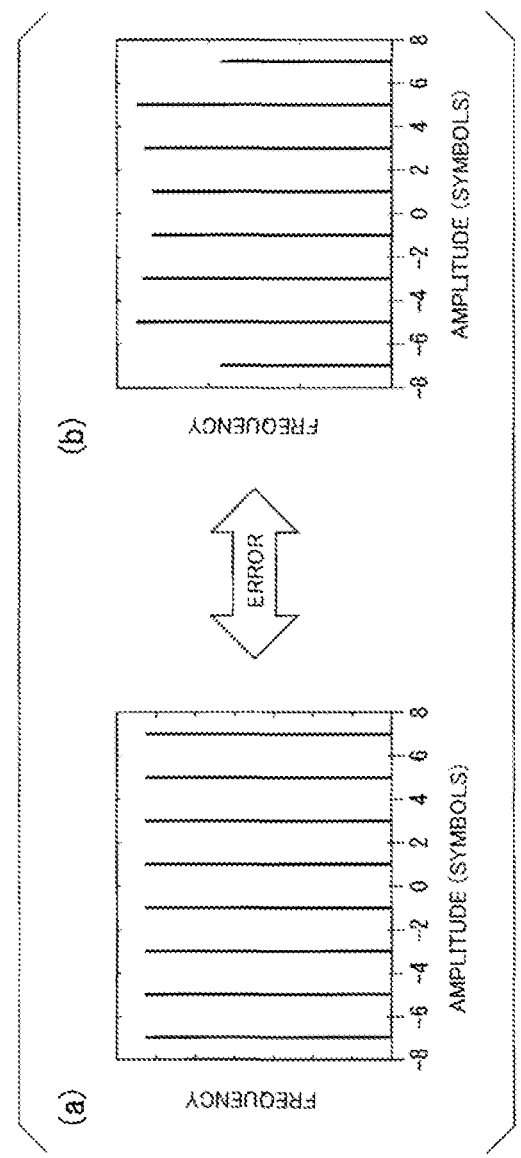
FIG. 7 is a diagram illustrating an example of histogram error according to the third embodiment.

For example, if the modulation method shared in advance between the transmitting side and the receiving side is PAM8, the transmission histogram will have the shape indicated in FIG. 7(a). In contrast, for example, if the histogram of the tentative decision signal output by the histogram generation unit 134 has the shape indicated in FIG. 7(b), the decision unit 132b calculates the error of these two histograms.

The decision unit 132b calculates an error e through the following Formula (9) on the basis of a frequency R_i of each bin of the histogram of the tentative decision signal and a frequency S_i of each bin of the transmission histogram. In Formula (9), "i" represents a bin number, and in the case of PAM8, i=1 to 8.

[Math. 9]

$$e = \sum_i (R\_i - S\_i) \quad (9)$$

The decision unit 132b also stores a permissible value of error in advance in the internal storage region. On the basis of the calculated error e and the permissible value of the error stored in the internal storage region, the decision unit 132b decides whether or not the aforementioned degree of agreement of the appearance frequencies for each symbol is within the permissible range. For example, when it is decided that the calculated error is within the permissible range, the decision unit 132b decides that the degree of agreement between the aforementioned appearance frequencies of each symbol is within the permissible range.

If the decision unit 132b decides that the calculated error is within the permissible range, the newest scale value r received from the update computation unit 133b is set as the optimum scale value r_opt. The decision unit 132b then outputs an instruction signal including the optimum scale value r_opt to the SN ratio calculation unit 14. If it is decided that the calculated error is not within the permissible range, the decision unit 132b outputs the histogram of the tentative decision signal and the transmission histogram to the update computation unit 133b.

The update computation unit 133b calculates a new scale value r on the basis of the histogram of the tentative decision signal output by the decision unit 132b and the transmission histogram, using a general optimization algorithm such as the mountain-climbing method, for example, to reduce the error e.

Additionally, the update computation unit 133b stores a predetermined initial value for the scale value r in an internal storage region. When the histogram of the tentative decision signal from the decision unit 132b and the transmission histogram are not provided, the update computation unit 133b outputs the initial value of the scale value r to the scale unit 130.

Processing by SN Ratio Estimation Circuit According to Third Embodiment

Figure 8:
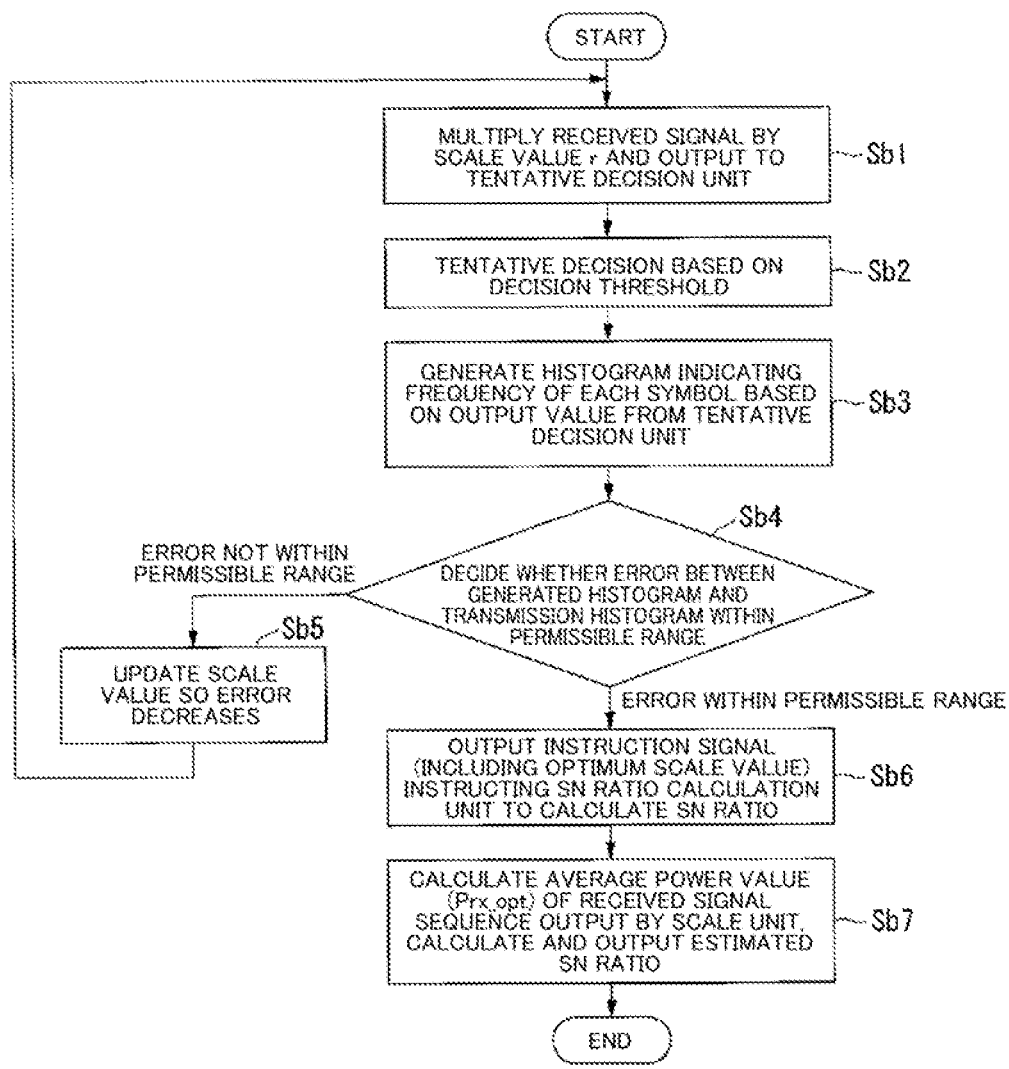
FIG. 8 is a flowchart illustrating the flow of processing by the SN ratio estimation circuit according to the third embodiment.

FIG. 8 is a flowchart illustrating the flow of processing by the SN ratio estimation circuit 1b of the third embodiment. In step Sb1 and step Sb2, the same processing as that of step S1 and step S2 in FIG. 2 is performed by the scale unit 130 and the tentative decision unit 12.

The histogram generation unit 134 generates a histogram indicating the appearance frequency for each symbol on the basis of the tentative decision signal output by the tentative decision unit 12 (step Sb3). The decision unit 132b calculates, through Formula (9), the error e on the basis of the histogram of the tentative decision signal output by the histogram generation unit 134 and the transmission histogram stored in the internal storage region. On the basis of the calculated error e and the permissible value of the error stored in the internal storage region, the decision unit 132b decides whether or not the calculated error e is within the permissible range (step Sb4).

If it is decided that the calculated error e is not within the permissible range ("error not within permissible range" in step Sb4), the decision unit 132b outputs the histogram of the tentative decision signal and the transmission histogram to the update computation unit 133b. The update computation unit 133b takes in the histogram of the tentative decision signal output by the decision unit 132b and the transmission histogram. On the basis of the histogram of the tentative decision signal and the transmission histogram that have been taken in, the update computation unit 133b calculates a new scale value r so that the error e decreases (step Sb5). The update computation unit 133b outputs the calculated new scale value r to the scale unit 130 and the decision unit 312b, and the processing from step Sb1 and on is performed.

On the other hand, if it is decided that the calculated error e is within the permissible range ("error within permissible range" in step Sb4), the decision unit 132b outputs an instruction signal instructing the SN ratio to be calculated to the SN ratio calculation unit 14 (step Sb6).

The scale value r when the error e is within the permissible range is the optimum scale value r_opt. When outputting the instruction signal in step Sb6, the decision unit 132b takes the newest scale value r received from the update computation unit 133b as the optimum scale value r_opt, and outputs the optimum scale value r_opt, included in the instruction signal, to the SN ratio calculation unit 14. In step Sb7, the same process as that of step S7 in FIG. 2 is performed by the SN ratio calculation unit 14.

In the SN ratio estimation circuit 1b of the third embodiment described thus far, the updating unit 13b includes the decision unit 132b, the update computation unit 133b, and the histogram generation unit 134. The histogram generation unit 134 generates a histogram indicating the appearance frequency for each symbol included in the tentative decision signal output by the tentative decision unit 12. On the basis of the error e between the histogram of the appearance frequency of each symbol in the reference signal, i.e., the transmission histogram, and the histogram generated by the histogram generation unit 134, the decision unit 132b decides whether or not the degree of agreement between the appearance frequencies is within a predetermined permissible range, and when it is decided that the degree of agreement is within the permissible range, outputs the instruction signal to the SN ratio calculation unit 14. When the decision unit 132b has decided that the degree of agreement is not within the permissible range, the update computation unit 133b updates the scale value r so that the error e decreases. This makes it possible to make the tentative decision with good accuracy. The tentative decision can therefore be made with good accuracy. Accordingly, the optimum scale value r_opt, i.e., the optimum normalization coefficient, can be found, and thus the SN ratio can be estimated without using a known signal. This makes it possible to perform demapping and error correction accurately on the receiving side.

Fourth Embodiment

Figure 9:
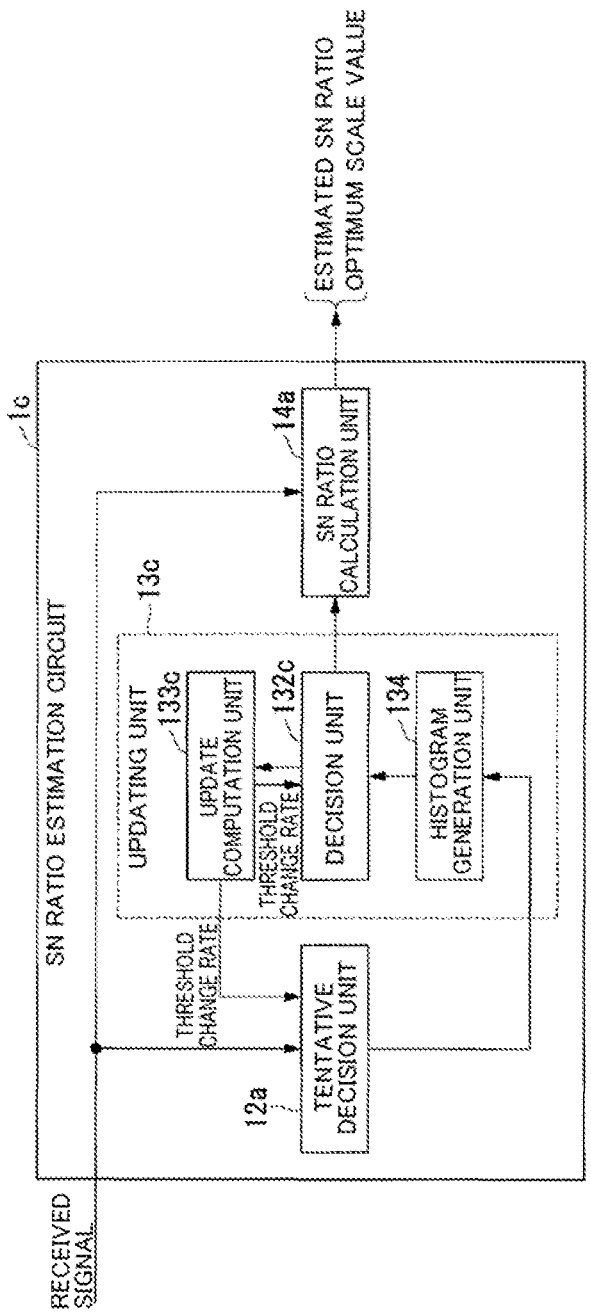
FIG. 9 is a block diagram illustrating the configuration of an SN ratio estimation circuit according to a fourth embodiment.

FIG. 9 is a block diagram illustrating the configuration of an SN ratio estimation circuit 1c of a fourth embodiment. In FIG. 9, configurations that are the same as in the SN ratio estimation circuit 1a of the second embodiment and the SN ratio estimation circuit 1b of the third embodiment are given the same reference signs, and the configurations which are different will be described hereinafter. The SN ratio estimation circuit 1c includes the tentative decision unit 12a, an updating unit 13c, and the SN ratio calculation unit 14a.

The updating unit 13c updates the threshold change rate b, which indicates a degree of change in the decision threshold, so that the appearance frequency of each symbol included in the tentative decision signal output by the tentative decision unit 12a matches the appearance frequency of each symbol in the reference signal. The updating unit 13c includes the histogram generation unit 134, a decision unit 132c, and an update computation unit 133c.

The decision unit 132c decides whether or not a degree of agreement between the appearance frequency of each symbol included in the tentative decision signal and the appearance frequency of each symbol in the reference signal is within a permissible range. The decision unit 132c stores, in advance, a transmission histogram, i.e., a histogram indicating the appearance frequency of each symbol of a signal obtained by modulating the transmitted signal using a modulation method shared in advance between the transmitting side and the receiving side. The decision unit 132c calculates the error e of the two histograms through Formula (9) on the basis of the histogram of the tentative decision signal output by the histogram generation unit 134 and the transmission histogram stored in the internal storage region.

The decision unit 132c also stores a permissible value of error in advance in the internal storage region. On the basis of the calculated error e and the permissible value of the error stored in the internal storage region, the decision unit 132c decides whether or not the aforementioned degree of agreement of the appearance frequencies for each symbol is within the permissible range. For example, when it is decided that the calculated error is within the permissible range, the decision unit 132c decides that the degree of agreement between the aforementioned appearance frequencies of each symbol is within the permissible range.

If the decision unit 132c decides that the calculated error is within the permissible range, the newest threshold change rate b received from the update computation unit 133c is set as the optimum threshold change rate b_opt. The decision unit 132c then outputs an instruction signal including the optimum threshold change rate b_opt to the SN ratio calculation unit 14a. If it is decided that the calculated error is not within the permissible range, the decision unit 132c outputs the histogram of the tentative decision signal and the transmission histogram to the update computation unit 133c.

The update computation unit 133c calculates a new threshold change rate b on the basis of the histogram of the tentative decision signal output by the decision unit 132c and the transmission histogram, using a general optimization algorithm such as the mountain-climbing method, for example, to reduce the error e.

The update computation unit 133c outputs the calculated new threshold change rate b to the tentative decision unit 12a and the decision unit 132c. Additionally, the update computation unit 133c stores a predetermined initial value for the threshold change rate b in an internal storage region. When the histogram of the tentative decision signal from the decision unit 132c and the transmission histogram are not provided, the update computation unit 133c outputs the initial value of the threshold change rate b to the tentative decision unit 12a and the decision unit 132c.

Processing by SN Ratio Estimation Circuit According to Fourth Embodiment

Figure 10:
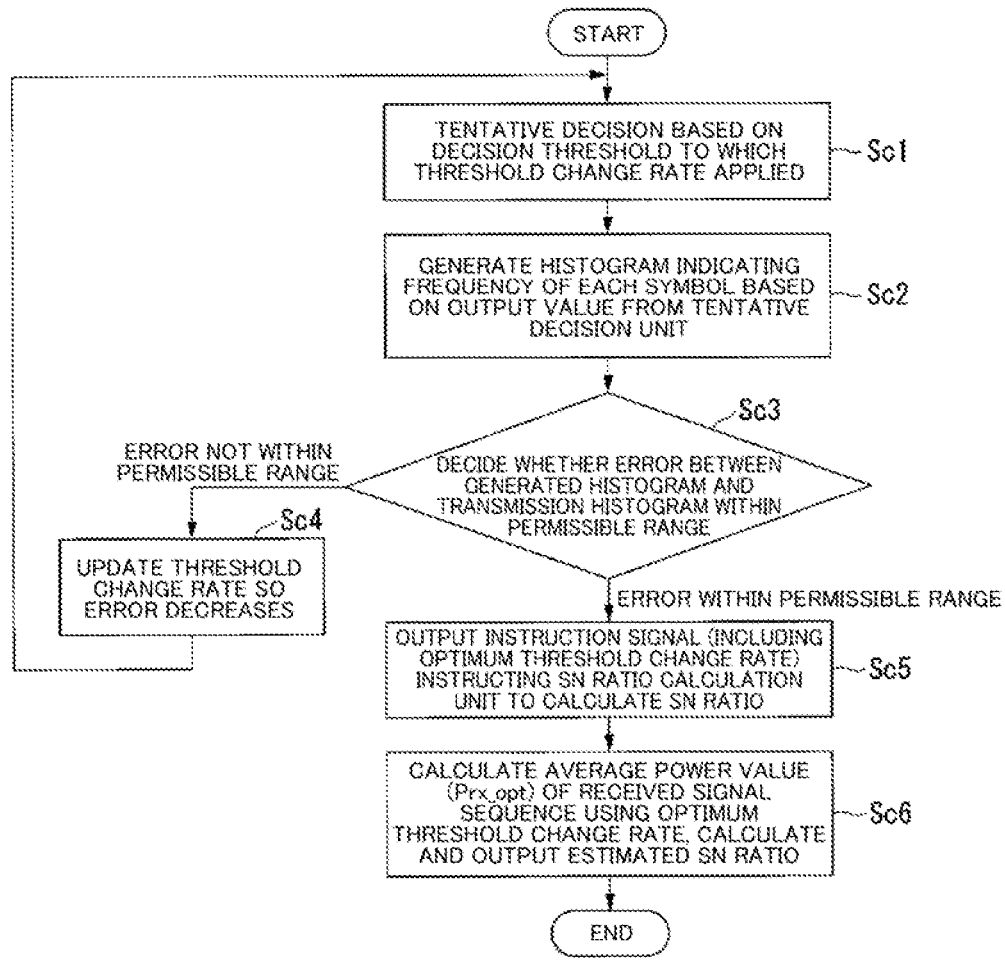
FIG. 10 is a flowchart illustrating the flow of processing by the SN ratio estimation circuit according to the fourth embodiment.

FIG. 10 is a flowchart illustrating the flow of processing by the SN ratio estimation circuit 1c of the fourth embodiment. In step Sc1, the same process as that of step Sa1 in FIG. 4 is performed by the tentative decision unit 12a. Additionally, in step Sc2 and step Sc3, the same processes as those of step Sb3 and step Sb4 in FIG. 8 are performed by the histogram generation unit 134 and the decision unit 132c.

If it is decided that the calculated error e is not within the permissible range ("error not within permissible range" in step Sc3), the decision unit 132c outputs the histogram of the tentative decision signal and the transmission histogram to the update computation unit 133c. On the basis of the histogram of the tentative decision signal and the transmission histogram, the update computation unit 133c calculates a new threshold change rate b so that the error e decreases (step Sc4). The update computation unit 133c outputs the calculated new threshold change rate b to the tentative decision unit 12a and the decision unit 132c, after which the processing of steps Sc1 and on is performed.

On the other hand, if it is decided that the calculated error e is within the permissible range ("error within permissible range" in step Sc3), the decision unit 132c outputs an instruction signal instructing the SN ratio to be calculated to the SN ratio calculation unit 14a (step Sc5).

The threshold change rate b when the error e is within the permissible range is the optimum threshold change rate b_opt. When outputting the instruction signal in step Sc5, the decision unit 132c takes the newest threshold change rate b received from the update computation unit 133c as the optimum threshold change rate b_opt, and outputs the optimum threshold change rate b_opt, included in the instruction signal, to the SN ratio calculation unit 14a. In step Sc6, the same process as that of step Sb6 in FIG. 4 is performed by the SN ratio calculation unit 14a.

In the SN ratio estimation circuit 1c of the fourth embodiment described thus far, the updating unit 13c includes the decision unit 132c, the update computation unit 133c, and the histogram generation unit 134. The histogram generation unit 134 generates a histogram indicating the appearance frequency for each symbol included in the tentative decision signal output by the tentative decision unit 12. On the basis of the error between the histogram of the appearance frequency of each symbol in the reference signal, i.e., the transmission histogram, and the histogram generated by the histogram generation unit 134, the decision unit 132c decides whether or not the degree of agreement between the appearance frequencies is within a predetermined permissible range, and when it is decided that the degree of agreement is within the permissible range, outputs the instruction signal to the SN ratio calculation unit 14a. When the decision unit 132c has decided that the degree of agreement is not within the permissible range, the update computation unit 133c updates the threshold change rate b so that the error decreases. This makes it possible to make the tentative decision with good accuracy. The tentative decision can therefore be made with good accuracy. Accordingly, the optimum scale value r_opt, which is the inverse of the optimum threshold change rate b_opt, i.e., the optimum normalization coefficient, can be found, and thus the SN ratio can be estimated without using a known signal. This makes it possible to perform demapping and error correction accurately on the receiving side.

Fifth Embodiment

Figure 11:
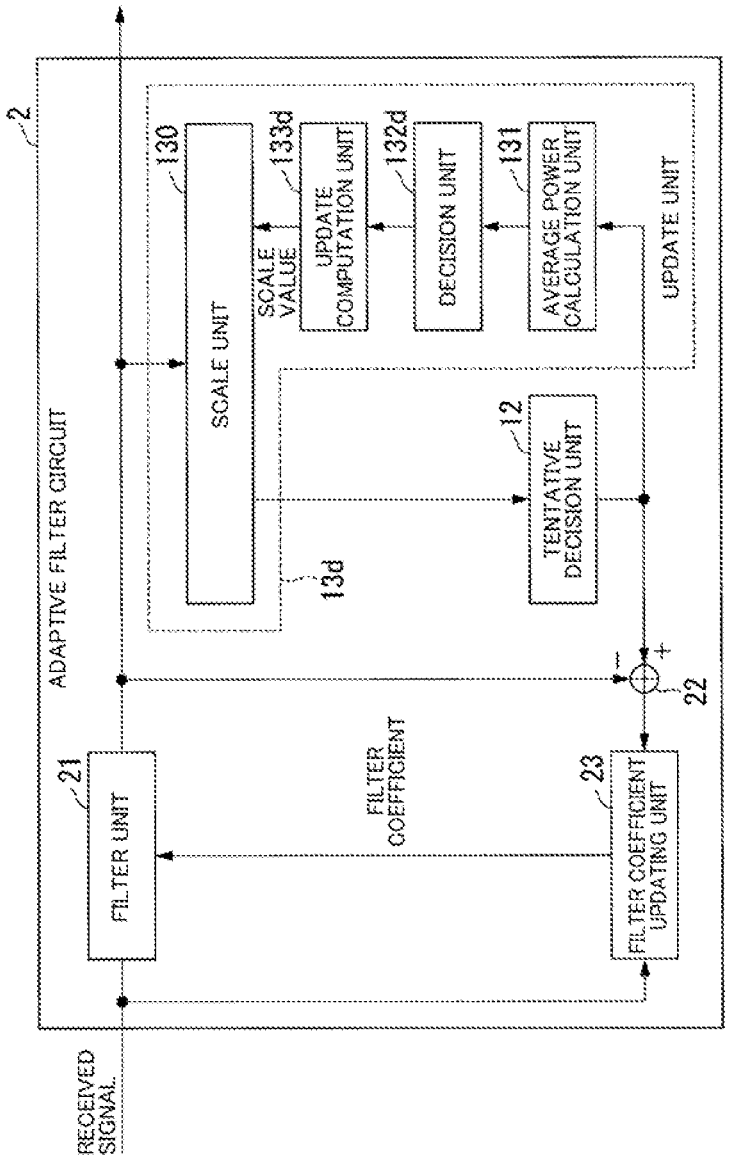
FIG. 11 is a block diagram illustrating the configuration of an adaptive filter circuit according to a fifth embodiment.

FIG. 11 is a block diagram illustrating the configuration of an adaptive filter circuit 2 of a fifth embodiment. In FIG. 11, configurations that are the same as in the SN ratio estimation circuit 1 of the first embodiment are given the same reference signs, and the configurations which are different will be described hereinafter. The adaptive filter circuit 2 is, for example, a decision-oriented adaptive filter based on MMSE norms, which is provided in the adaptive equalization unit 204 indicated in FIG. 23.

The adaptive filter circuit 2 includes a filter unit 21, an adder 22, a filter coefficient updating unit 23, the tentative decision unit 12, and an updating unit 13d. The filter unit 21 takes in a received signal provided from the exterior and filters the received signal on the basis of a filter coefficient output by the filter coefficient updating unit 23. Here, the received signal provided from the exterior is a signal output by the wavelength dispersion compensation unit 203 in FIG. 23.

The adder 22 subtracts the filtered received signal output by the filter unit 21 from the tentative decision signal output by the tentative decision unit 12. The adder 22 outputs the subtractive signal obtained from the subtraction to the filter coefficient updating unit 23.

The filter coefficient updating unit 23 calculates a filter coefficient on the basis of the subtractive signal output by the adder 22 and the received signal provided from the exterior. The filter coefficient updating unit 23 outputs the calculated filter coefficient to the filter unit 21. The filter coefficient updating unit 23 also stores an initial value of the filter coefficient in advance in an internal storage region. When the adder 22 is not outputting the subtractive signal, the filter coefficient updating unit 23 outputs the initial value of the filter coefficient stored in the internal storage region to the filter unit 21.

The updating unit 13d updates the scale value r, which indicates a rate of increase or reduction of the filtered received signal, so that the appearance frequency of each symbol included in the tentative decision signal output by the tentative decision unit 12 matches the appearance frequency of each symbol in the reference signal. The updating unit 13d includes the scale unit 130, the average power calculation unit 131, a decision unit 132d, and an update computation unit 133d.

Aside from the following point, the decision unit 132d has the same configuration as the decision unit 132 of the first embodiment. Although the decision unit 132 of the first embodiment outputs the instruction signal to the SN ratio calculation unit 14 when it is decided that Pref/Ptmp is lower than the target ratio, the decision unit 132d does not output the instruction signal when it is decided that Pref/Ptmp is lower than the target ratio.

Aside from the following point, the update computation unit 133d has the same configuration as the update computation unit 133 of the first embodiment. The update computation unit 133 of the first embodiment outputs the new scale value r to the tentative decision unit 12 and the decision unit 132 when the new scale value r is calculated. As opposed to this, the update computation unit 133d outputs the new scale value r only to the scale unit 130 when the new scale value r is calculated.

Processing by Adaptive Filter Circuit of Fifth Embodiment

Figure 12:
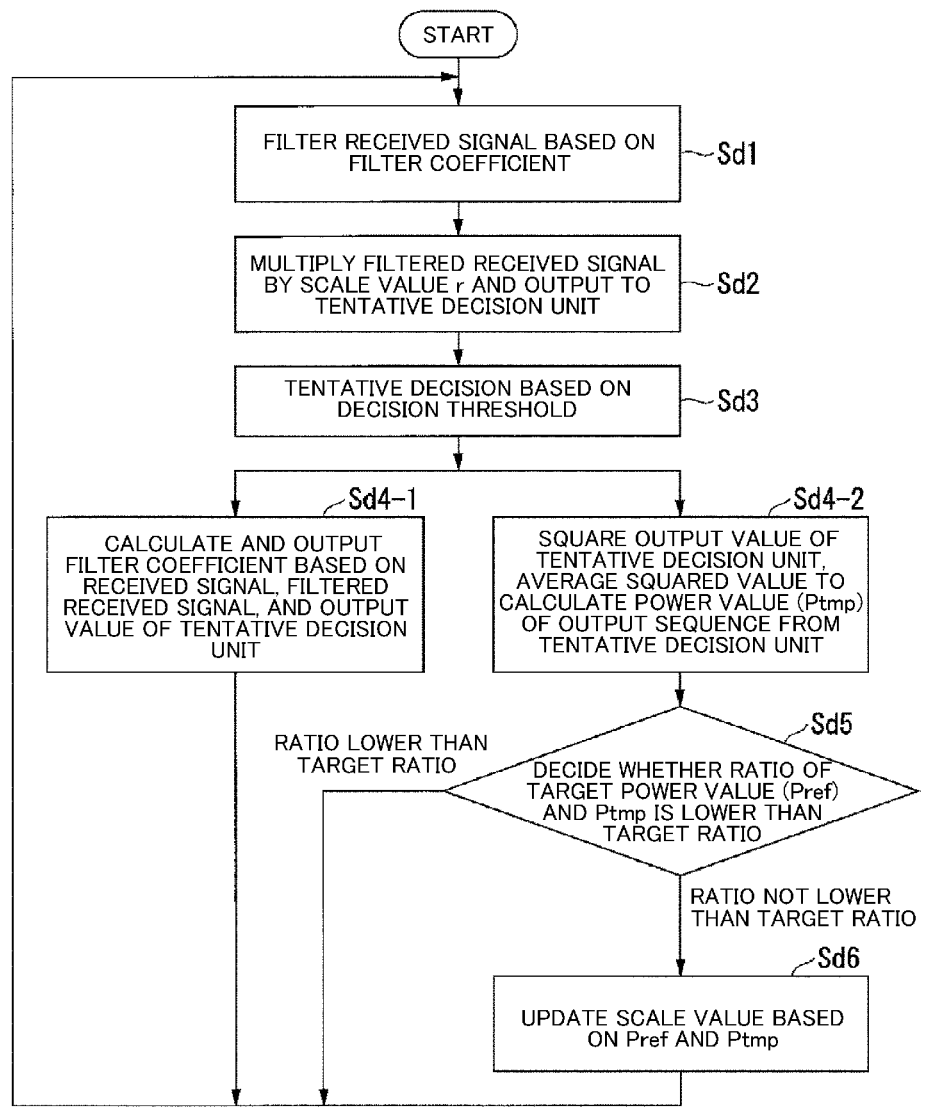
FIG. 12 is a flowchart illustrating the flow of processing by the adaptive filter circuit according to the fifth embodiment.

FIG. 12 is a flowchart illustrating the flow of processing by the adaptive filter circuit 2 of the fifth embodiment. The filter unit 21 takes in the received signal provided from the exterior. The filter unit 21 then filters the received signal on the basis of the filter coefficient output by the filter coefficient updating unit 23 (step Sd1). Note that when the subtractive signal is not being provided by the adder 22, the filter coefficient updating unit 23 outputs the initial value of the filter coefficient stored in the internal storage region to the filter unit 21.

The scale unit 130 takes in the scale value r output by the update computation unit 133d. The scale unit 130 takes in the filtered received signal output by the filter unit 21. The scale unit 130 then multiplies the filtered received signal which has been taken in by the scale value r and outputs the result to the tentative decision unit 12 (step Sd2). Note that if the target power value Pref from the decision unit 132d and the average power value Ptmp of the tentative decision signal have not been provided, the update computation unit 133d outputs the initial value of the scale value r to the scale unit 130.

The tentative decision unit 12 detects a symbol by making a tentative decision on the received signal multiplied by the scale value r on the basis of the decision threshold stored in the internal storage region. The tentative decision unit 12 outputs a tentative decision signal including a detected symbol sequence (step Sd3).

The adder 22 subtracts the filtered received signal output by the filter unit 21 from the tentative decision signal output by the tentative decision unit 12. The adder 22 outputs the subtractive signal obtained from the subtraction to the filter coefficient updating unit 23. The filter coefficient updating unit 23 calculates a filter coefficient on the basis of the subtractive signal output by the adder 22 and the received signal provided from the exterior. The filter coefficient updating unit 23 outputs the calculated filter coefficient to the filter unit 21 (step Sd4-1).

In steps Sd4-2, Sd5, and Sd6, the same processes as those of steps S3, S4, and S5 in FIG. 2 are performed by the average power calculation unit 131, the decision unit 132d, and the update computation unit 133d. Note that when the decision unit 132d decides in step Sd5 that Pref/Ptmp is lower than the target ratio ("ratio lower than target ratio" in step Sd5), the processing is performed from step Sd1 without the instruction signal being output. Additionally, in step Sd6, the update computation unit 133d outputs the calculated new scale value r only to the scale unit 130, and not to the decision unit 132d.

As a result, the scale value r is not updated when Pref/Ptmp is lower than the target ratio, and the scale value r stays at the optimum scale value r_opt.

In the fifth embodiment described above, the update computation unit 133d calculates the new scale value on the basis of Formula (2). However, for example, the new scale value r may be calculated through Formula (6), using the step size u in which 1>u>0. This reduces the range of change in the scale value r. It is therefore possible to specify a more optimum scale value r.

In the adaptive filter circuit 2 of the fifth embodiment described thus far, the filter unit 21 filters the received signal on the basis of the filter coefficient. The tentative decision unit 12 makes a tentative decision for symbols on the basis of the filtered received signal and the decision threshold, and outputs a tentative decision signal including a sequence of symbols. The updating unit 13d updates the scale value r, which indicates a rate of increase or reduction of the filtered received signal, so that the appearance frequency of each symbol included in the tentative decision signal output by the tentative decision unit 12 matches the appearance frequency of each symbol in the reference signal. On the basis of the received signal, the filtered received signal, and the tentative decision signal output by the tentative decision unit 12, the filter coefficient updating unit 23 calculates an update value for the filter coefficient, and provides the calculated update value for the filter coefficient to the filter unit 21. Additionally, the tentative decision unit 12 makes a tentative decision on the symbol on the basis of the filtered received signal, which is increased or reduced by the updated scale value r, and the decision threshold.

To describe in more detail, the updating unit 13d includes the average power calculation unit 131, the decision unit 132d, and the update computation unit 133d, and the average power calculation unit 131 calculates the average power value (Ptmp) of the tentative decision signal output by the tentative decision unit 12. The decision unit 132d decides whether the degree of agreement between the appearance frequencies is within the predetermined permissible range on the basis of the target power value Pref, which is calculated from the appearance frequency of each symbol in the reference signal, and the average power value Ptmp. If the decision unit 132d has decided that the degree of agreement is not within the permissible range, the update computation unit 133d updates the scale value r on the basis of the target power value (Pref) and the average power value (Ptmp). Through this, the optimum scale value r_opt, i.e., the optimum normalization coefficient can be found, and thus an accurate tentative decision can be made even in a low-SN ratio region. Therefore, the step size, which is a parameter pertaining to convergence speed, can be increased even in the low-SN ratio region, which makes it possible to increase the convergence speed of the filter coefficients.

Sixth Embodiment

Figure 13:
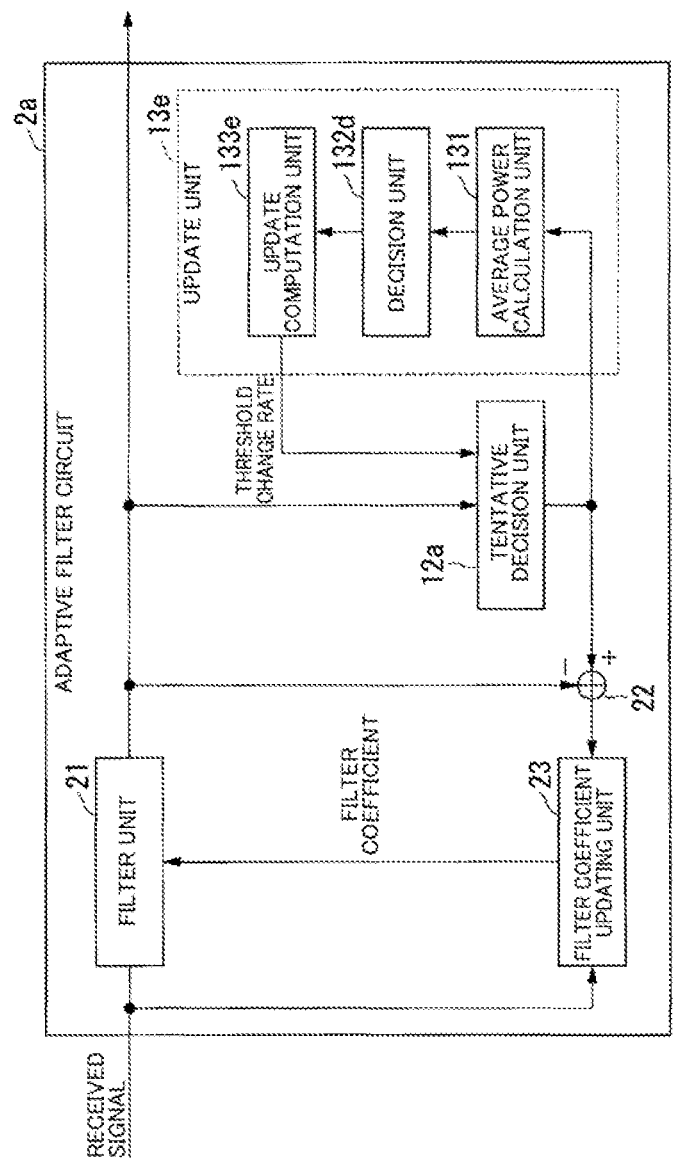
FIG. 13 is a block diagram illustrating the configuration of an adaptive filter circuit according to a sixth embodiment.

FIG. 13 is a block diagram illustrating the configuration of an adaptive filter circuit 2a of a sixth embodiment. In FIG. 13, configurations that are the same as in the SN ratio estimation circuit 1a of the second embodiment and the adaptive filter circuit 2 of the fifth embodiment are given the same reference signs, and the configurations which are different will be described hereinafter. The adaptive filter circuit 2a is, for example, a decision-oriented adaptive filter based on MMSE norms, which is provided in the adaptive equalization unit 204 indicated in FIG. 23.

The adaptive filter circuit 2a includes the filter unit 21, the adder 22, the filter coefficient updating unit 23, the tentative decision unit 12a, and an updating unit 13e.

The updating unit 13e updates the threshold change rate b, which indicates a degree of change in the decision threshold, so that the appearance frequency of each symbol included in the tentative decision signal output by the tentative decision unit 12a matches the appearance frequency of each symbol in the reference signal. The updating unit 13e includes the average power calculation unit 131, a decision unit 132d, and the update computation unit 133e.

Aside from the following point, the update computation unit 133e has the same configuration as the update computation unit 133a of the second embodiment. The update computation unit 133a of the second embodiment outputs the new threshold change rate b to the tentative decision unit 12a and the decision unit 132a when the new threshold change rate b is calculated. As opposed to this, the update computation unit 133e outputs the new threshold change rate b only to the tentative decision unit 12a when the new threshold change rate b is calculated.

Processing by Adaptive Filter Circuit of Sixth Embodiment

Figure 14:
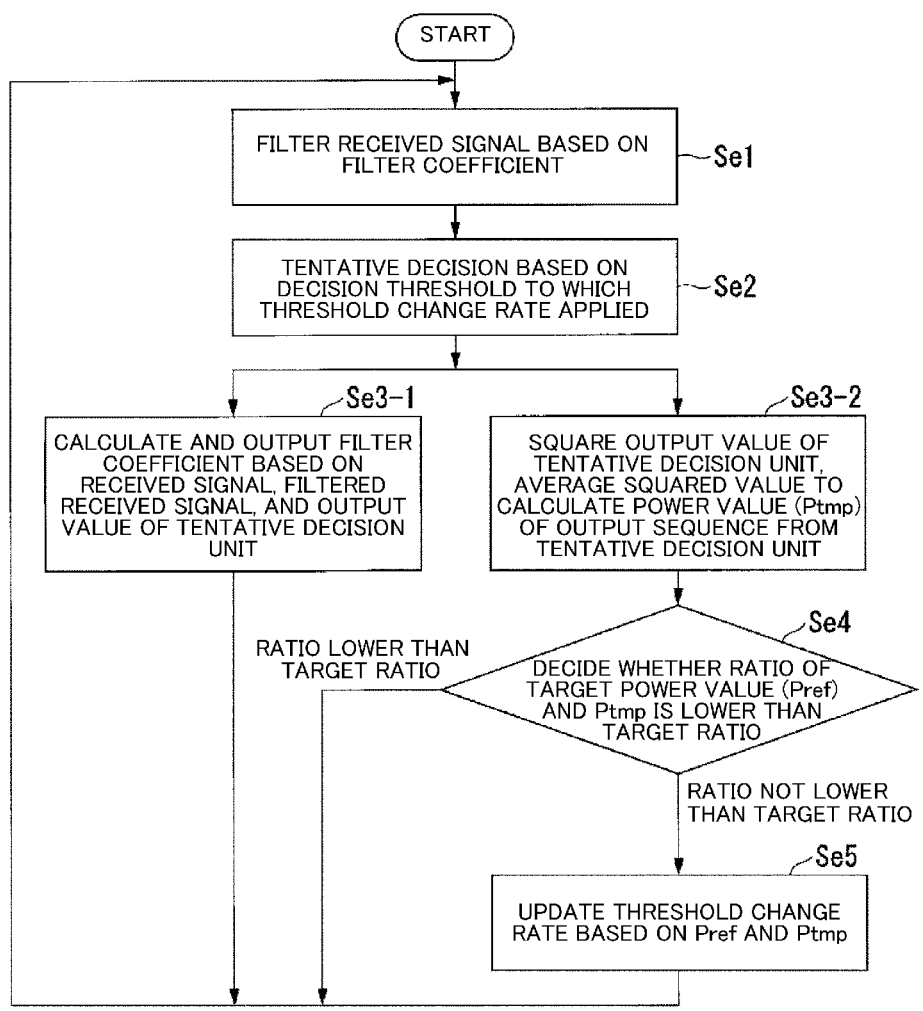
FIG. 14 is a flowchart illustrating the flow of processing by the adaptive filter circuit according to the sixth embodiment.

FIG. 14 is a flowchart illustrating the flow of processing by the adaptive filter circuit 2a of the sixth embodiment. In step Se1, the same process of that as step Sd1 in FIG. 12 is performed by the filter unit 21.

The tentative decision unit 12a takes in the threshold change rate b output by the update computation unit 133e. Note that if the target power value Pref from the decision unit 132e and the average power value Ptmp of the tentative decision signal have not been provided, the update computation unit 133e outputs the initial value of the threshold change rate b to the tentative decision unit 12a.

The tentative decision unit 12a multiplies the threshold included in the decision threshold stored in the internal storage region by the threshold change rate b. The tentative decision unit 12a takes in the received signal filtered by the filter unit 21. The tentative decision unit 12a makes a tentative decision on the symbols on the basis of the filtered received signal that has been taken in and the decision threshold to which the threshold change rate b has been applied, and outputs a tentative decision signal including a symbol sequence, which is the result of the tentative decision (step Se2).

In step Se3-1, the same process as that of step Sd4-1 in FIG. 12 is performed by the adder 22 and the filter coefficient updating unit 23. Additionally, in steps Se3-2, Se4, and Se5, the same processes as those of steps Sa2, Sa3, and Sa4 in FIG. 4 are performed by the average power calculation unit 131, the decision unit 132d, and the update computation unit 133e. Note that when the decision unit 132d has decided in step Se4 that Pref/Ptmp is lower than the target ratio "ratio lower than target ratio" in step Se4), the processing is performed from step Se1 without the instruction signal being output. Additionally, in step Se5, the update computation unit 133e outputs the calculated new threshold change rate b only to the tentative decision unit 12a, and not to the decision unit 132d.

Through this, when Pref/Ptmp is lower than the target ratio, the threshold change rate b is not updated, and the threshold change rate b is kept at the optimum threshold change rate b_opt.

In the adaptive filter circuit 2a of the sixth embodiment described thus far, the filter unit 21 filters the received signal on the basis of the filter coefficient. The tentative decision unit 12a makes a tentative decision for symbols on the basis of the filtered received signal and the decision threshold, and outputs a tentative decision signal including a sequence of symbols. The updating unit 13e updates the threshold change rate b, which indicates a degree of change in the decision threshold, so that the appearance frequency of each symbol included in the tentative decision signal output by the tentative decision unit 12a matches the appearance frequency of each symbol in the reference signal. On the basis of the received signal, the filtered received signal, and the tentative decision signal output by the tentative decision unit 12a, the filter coefficient updating unit 23 calculates the update value of the filter coefficient, and provides the calculated update value of the filter coefficient to the filter unit 21. Additionally, the tentative decision unit 12a makes a tentative decision on the symbols on the basis of the filtered received signal and the decision threshold to which the updated threshold change rate b has been applied.

To describe this in more detail, the updating unit 13d includes the average power calculation unit 131, the decision unit 132d, and the update computation unit 133e. The average power calculation unit 131 calculates the average power value Ptmp of the tentative decision signal output by the tentative decision unit 12. The decision unit 132d decides whether the degree of agreement between the appearance frequencies is within the predetermined permissible range on the basis of the target power value Pref, which is calculated from the appearance frequency of each symbol in the reference signal, and the average power value Ptmp. If the decision unit 132d has decided that the degree of agreement is not within the permissible range, the update computation unit 133e updates the threshold change rate b on the basis of the target power value (Pref) and the average power value (Ptmp). Through this, the optimum scale value r_opt, which is the inverse of the optimum threshold change rate b_opt, i.e., the optimum normalization coefficient, can be found, and thus an accurate tentative decision can be made even in a low-SN ratio region. Therefore, the step size, which is a parameter pertaining to convergence speed, can be increased even in the low-SN ratio region, which makes it possible to increase the convergence speed of the filter coefficients.

Seventh Embodiment

Figure 15:
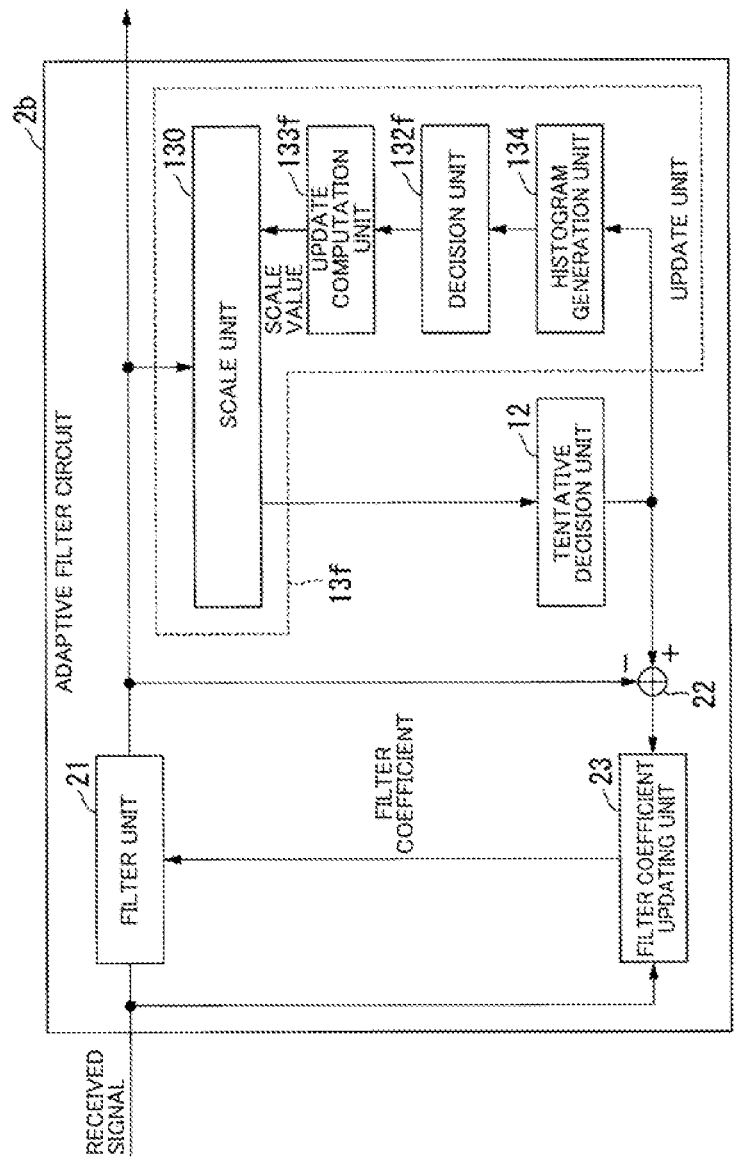
FIG. 15 is a block diagram illustrating the configuration of an adaptive filter circuit according to a seventh embodiment.

FIG. 15 is a block diagram illustrating the configuration of an adaptive filter circuit 2b of a seventh embodiment. In FIG. 15, configurations that are the same as in the SN ratio estimation circuit 1b of the third embodiment and the adaptive filter circuit 2 of the fifth embodiment are given the same reference signs, and the configurations which are different will be described hereinafter. The adaptive filter circuit 2b is, for example, a decision-oriented adaptive filter based on MMSE norms, which is provided in the adaptive equalization unit 204 indicated in FIG. 23.

The adaptive filter circuit 2b includes the filter unit 21, the adder 22, the filter coefficient updating unit 23, the tentative decision unit 12, and an updating unit 13f.

The updating unit 13f updates the scale value, which indicates a rate of increase or reduction of the filtered received signal, so that the appearance frequency of each symbol included in the tentative decision signal output by the tentative decision unit 12 matches the appearance frequency of each symbol in the reference signal. The updating unit 13f includes the scale unit 130, the histogram generation unit 134, a decision unit 132f, and an update computation unit 133f.

Aside from the following point, the decision unit 132f has the same configuration as the decision unit 132b of the third embodiment. The decision unit 132b of the third embodiment outputs the instruction signal to the SN ratio calculation unit 14 when it is decided that the calculated error is within the permissible range. As opposed to this, the decision unit 132f does not output the instruction signal when it is decided that the calculated error is within the permissible range.

Aside from the following point, the update computation unit 133f has the same configuration as the update computation unit 133b of the third embodiment. The update computation unit 133b of the third embodiment outputs the new scale value r to the scale unit 130 and the decision unit 132b when the new scale value r is calculated. As opposed to this, the update computation unit 133f outputs the new scale value r only to the scale unit 130 when the new scale value r is calculated.

Processing by Adaptive Filter Circuit of Seventh Embodiment

Figure 16:
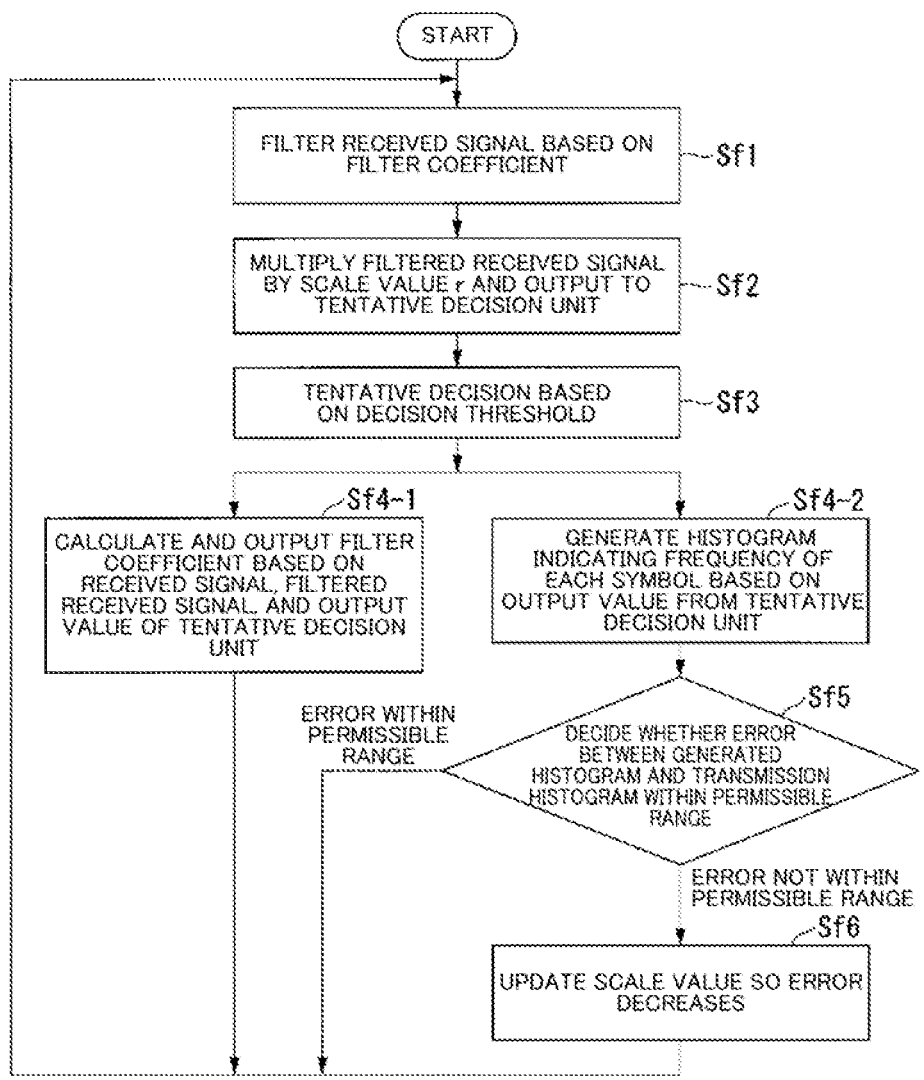
FIG. 16 is a flowchart illustrating the flow of processing by the adaptive filter circuit according to the seventh embodiment.

FIG. 16 is a flowchart illustrating the flow of processing by the adaptive filter circuit 2c of the seventh embodiment. In steps Sf1, Sf2, Sf3, and Sf4-1, the same processes as those of steps Sd1, Sd2, Sd3, and Sd4-1 in FIG. 12 are performed by the scale unit 130, the tentative decision unit 12, the filter unit 21, the adder 22, and the filter coefficient updating unit 23. Note that in step Sf2, when the histogram of the tentative decision signal from the histogram generation unit 134 and the transmission histogram are not provided, the update computation unit 133f outputs the initial value of the scale value r to the scale unit 130.

Additionally, in steps Sf4-2, Sf5, and Sf6, the processes of steps Sb3, Sb4, and Sb5 in FIG. 8 are performed by the histogram generation unit 134, the decision unit 132f, and the update computation unit 133f. Note that if the decision unit 132f has decided in step Sf5 that the calculated error is within the permissible range ("error within permissible range" in step Sf5), the processing is performed from step Sf1 without the instruction signal being output. Additionally, in step Sf6, the update computation unit 133f outputs the calculated new scale value r only to the scale unit 130, and not to the decision unit 132f.

As a result, the scale value r is not updated when the error is within the permissible range, and the scale value r stays at the optimum scale value r_opt.

In the adaptive filter circuit 2b of the seventh embodiment described thus far, the updating unit 13f includes the decision unit 132f, the update computation unit 133f, and the histogram generation unit 134. The histogram generation unit 134 generates a histogram indicating the appearance frequency for each symbol included in the tentative decision signal output by the tentative decision unit 12. On the basis of the error between the histogram of the appearance frequency for each symbol in the reference signal, i.e., the transmission histogram, and the histogram generated by the histogram generation unit 134, the decision unit 132f decides whether or not the degree of agreement between the appearance frequencies is within the predetermined permissible range. When the decision unit 132f has decided that the degree of agreement is not within the permissible range, the update computation unit 133f updates the scale value r so that the error decreases. Through this, the optimum scale value r_opt, i.e., the optimum normalization coefficient can be found, and thus an accurate tentative decision can be made even in a low-SN ratio region. Therefore, the step size, which is a parameter pertaining to convergence speed, can be increased even in the low-SN ratio region, which makes it possible to increase the convergence speed of the filter coefficients.

Eighth Embodiment

Figure 17:
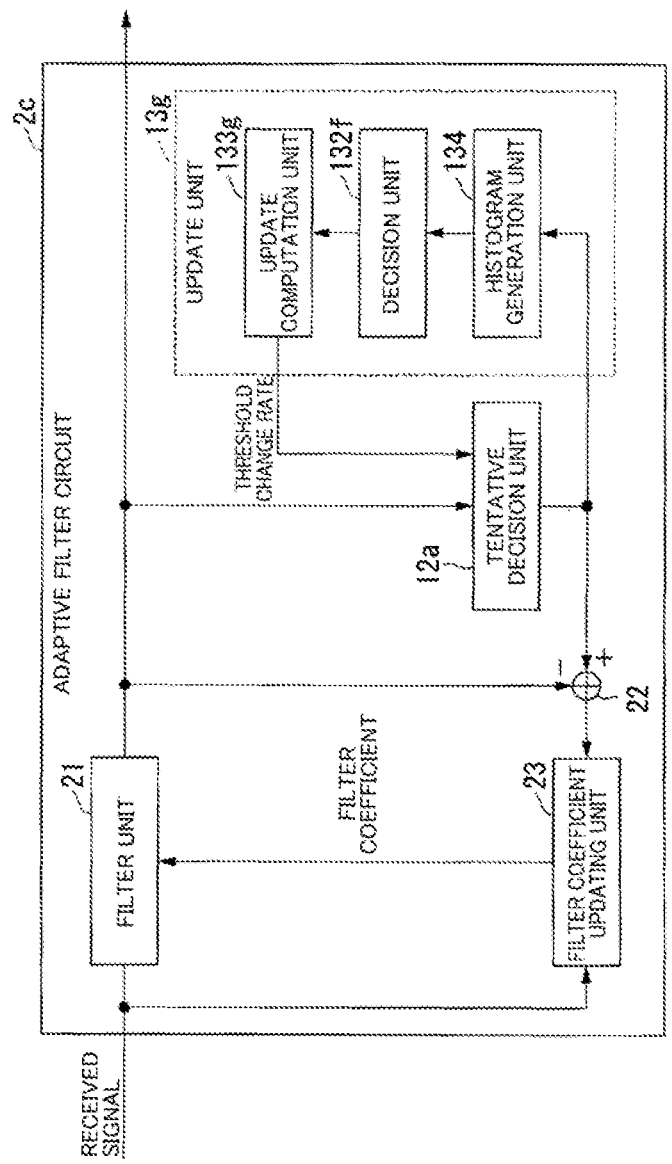
FIG. 17 is a block diagram illustrating the configuration of an adaptive filter circuit according to an eighth embodiment.

FIG. 17 is a block diagram illustrating the configuration of an adaptive filter circuit 2c of an eighth embodiment. In FIG. 17, configurations that are the same as in the SN ratio estimation circuit 1c of the fourth embodiment, the adaptive filter circuit 2 of the fifth embodiment, and the adaptive filter circuit 2b of the seventh embodiment are given the same reference signs, and configurations that are different will be described below. The adaptive filter circuit 2c is, for example, a decision-oriented adaptive filter based on MMSE norms, which is provided in the adaptive equalization unit 204 indicated in FIG. 23.

The adaptive filter circuit 2c includes the filter unit 21, the adder 22, the filter coefficient updating unit 23, the tentative decision unit 12a, and an updating unit 13g.

The updating unit 13g updates the threshold change rate b, which indicates a degree of change in the decision threshold, so that the appearance frequency of each symbol included in the tentative decision signal output by the tentative decision unit 12a matches the appearance frequency of each symbol in the reference signal. The updating unit 13g includes the decision unit 132f, an update computation unit 133g, and the histogram generation unit 134.

Aside from the following point, the update computation unit 133g has the same configuration as the update computation unit 133c of the fourth embodiment. The update computation unit 133c of the fourth embodiment outputs the new threshold change rate b to the tentative decision unit 12a and the decision unit 132c when the new threshold change rate b is calculated, but the update computation unit 133g outputs the new threshold change rate b only to the tentative decision unit 12a when the new threshold change rate b is calculated.

Processing by Adaptive Filter Circuit of Eighth Embodiment

Figure 18:
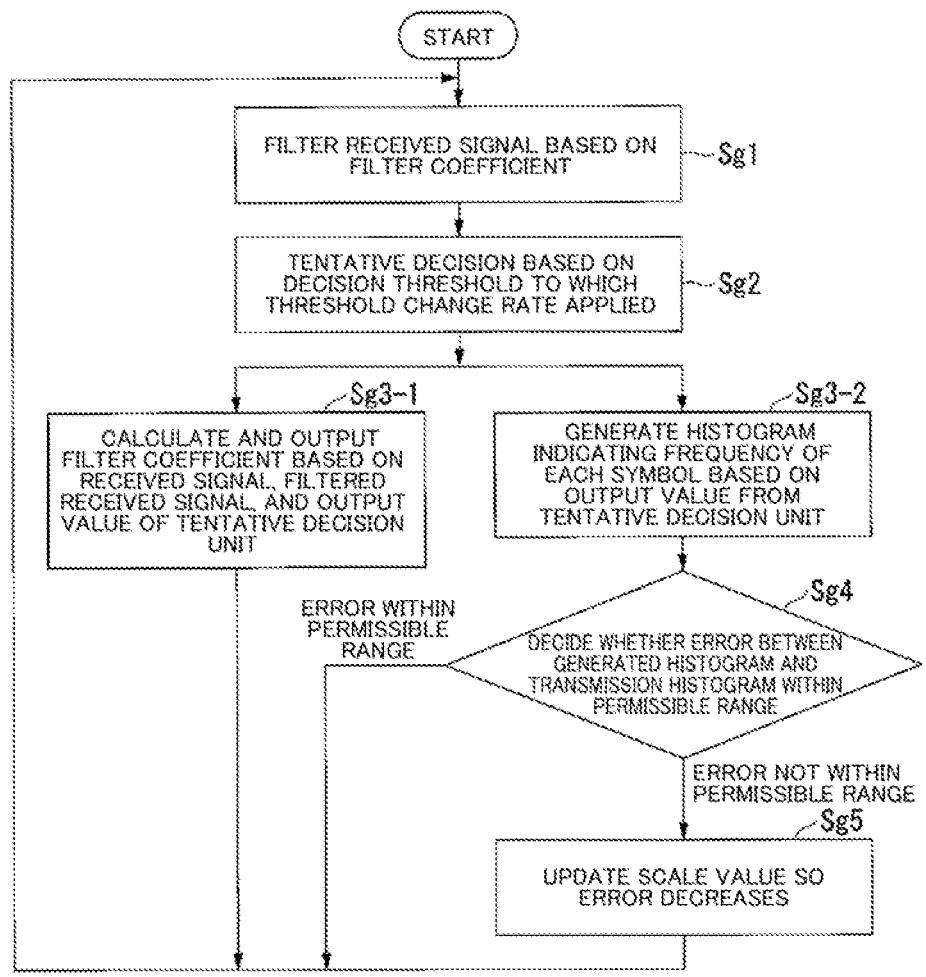
FIG. 18 is a flowchart illustrating the flow of processing by the adaptive filter circuit according to the eighth embodiment.

FIG. 18 is a flowchart illustrating the flow of processing by the adaptive filter circuit 2c of the eighth embodiment. In steps Sg1, Sg2, and Sg3-1, the same processes as those of steps Se1, Se2, and Se3-1 in FIG. 14 are performed by the tentative decision unit 12a, the filter unit 21, the adder 22, and the filter coefficient updating unit 23. Note that in step Sg2, when the histogram of the tentative decision signal from the histogram generation unit 134 and the transmission histogram are not provided, the update computation unit 133g outputs the initial value of the threshold change rate b to the tentative decision unit 12a.

In steps Sg3-2, Sg4, and Sg5, the processes of steps Sc2, Sc3, and Sc4 in FIG. 10 are performed by the histogram generation unit 134, the decision unit 132f, and the update computation unit 133g. Note that if the decision unit 132f has decided in step Sg4 that the calculated error is within the permissible range ("error within permissible range" in step Sg4), the processing is performed from step Sg1 without the instruction signal being output. Additionally, in step Sg5, the update computation unit 133g outputs the calculated new threshold change rate b only to the tentative decision unit 12a, and not to the decision unit 132f.

Through this, when the error is within the permissible range, the threshold change rate b is not updated, and the threshold change rate b is kept at the optimum threshold change rate b_opt.

In the adaptive filter circuit 2c of the eighth embodiment described thus far, the updating unit 13g includes the decision unit 132f, the update computation unit 133g, and the histogram generation unit 134. The histogram generation unit 134 generates a histogram indicating the appearance frequency for each symbol included in the tentative decision signal output by the tentative decision unit 12. On the basis of the error between the histogram of the appearance frequency for each symbol in the reference signal and the histogram generated by the histogram generation unit 134, the decision unit 132f decides whether or not the degree of agreement between the appearance frequencies is within the predetermined permissible range. When the decision unit 132f has decided that the degree of agreement is not within the permissible range, the update computation unit 133g updates the threshold change rate b so that the error decreases. Through this, the optimum scale value r_opt, which is the inverse of the optimum threshold change rate b_opt, i.e., the optimum normalization coefficient, can be found, and thus an accurate tentative decision can be made even in a low-SN ratio region. Therefore, the step size, which is a parameter pertaining to convergence speed, can be increased even in the low-SN ratio region, which makes it possible to increase the convergence speed of the filter coefficients.

Other Examples of Configuration of Adaptive Filter Circuit

The adaptive filter circuits 2, 2a, 2b, and 2c described in the fifth through eighth embodiments are configured including the updating units 13d, 13e, 13f, and 13g, respectively.

Figure 19:
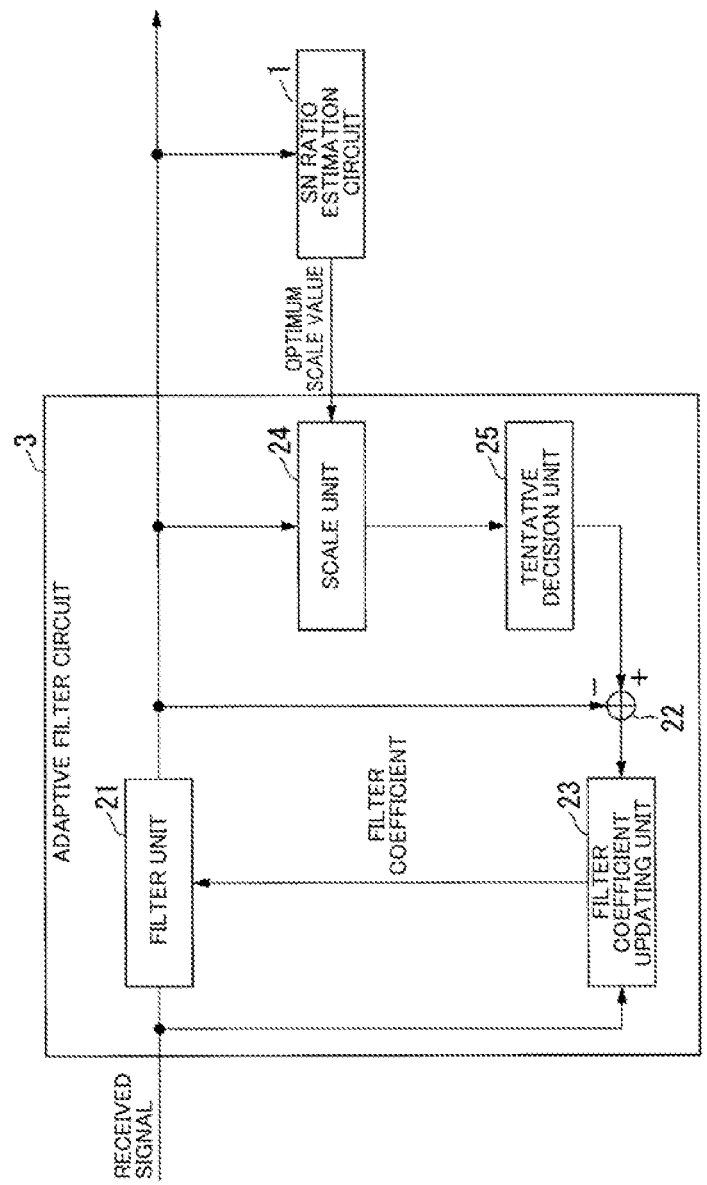
FIG. 19 is a block diagram illustrating another configuration example of an adaptive filter circuit (No. 1).

As opposed to this, the configuration may be such that the optimum scale value r_opt, which is the output of the SN ratio estimation circuit 1 of the first embodiment, is taken in, as in an adaptive filter circuit 3 illustrated in FIG. 19. In FIG. 19, configurations that are the same as those in the fifth embodiment are given the same reference signs. In FIG. 19, a scale unit 24 has the same configuration as the scale unit 130 of the first embodiment, taking in the received signal filtered by the filter unit 21, multiplying the received signal that has been taken in by the optimum scale value r_opt output by the SN ratio estimation circuit 1, and outputting the result to a tentative decision unit 25.

The tentative decision unit 25 has the same configuration as the tentative decision unit 12 of the first embodiment, taking in the filtered received signal multiplied by the optimum scale value r_opt by the scale unit 24. The tentative decision unit 25 stores a decision threshold in advance in an internal storage region. The tentative decision unit 25 makes a tentative decision on the symbols on the basis of the received signal that has been taken in and the decision threshold stored in the internal storage region, and outputs a tentative decision signal including a symbol sequence, which is the result of the tentative decision.

Note that in FIG. 19, the SN ratio estimation circuit 1b of the third embodiment may be applied instead of the SN ratio estimation circuit 1 of the first embodiment.

Figure 20:
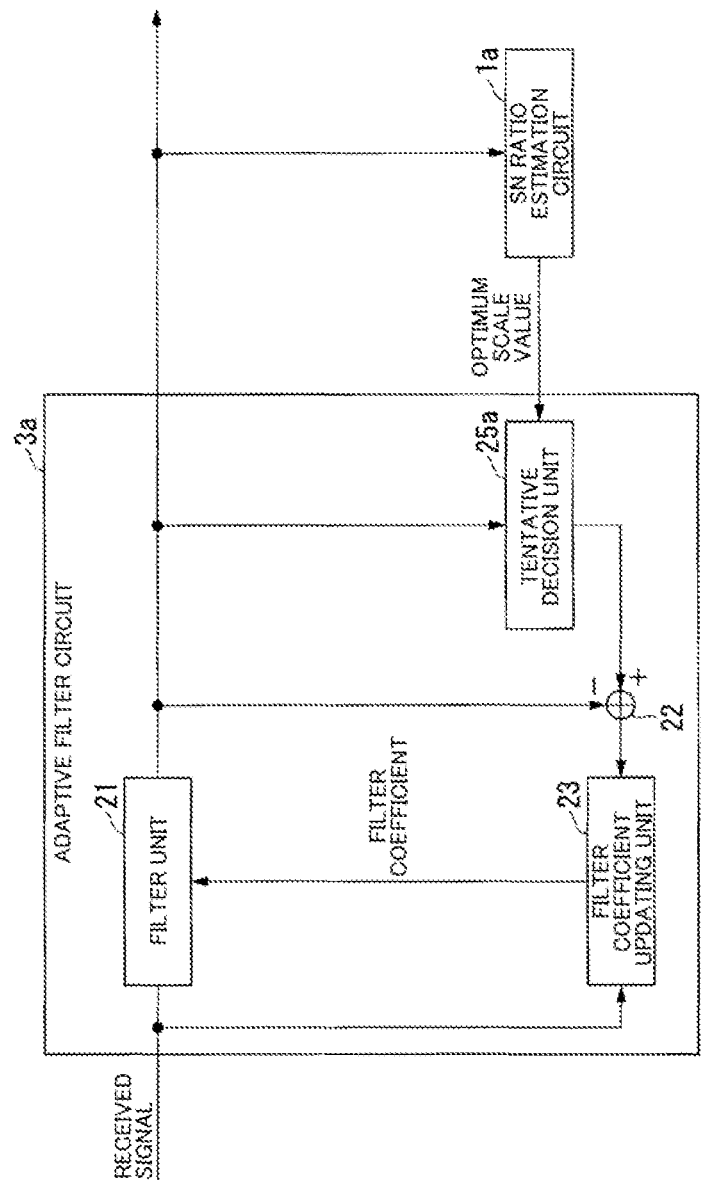
FIG. 20 is a block diagram illustrating another configuration example of an adaptive filter circuit (No. 2).

Additionally, the configuration may be such that the optimum scale value r_opt, which is the output of the SN ratio estimation circuit 1a of the second embodiment, is taken in, as in an adaptive filter circuit 3a illustrated in FIG. 20. In FIG. 20, configurations that are the same as those in the fifth embodiment are given the same reference signs. In FIG. 20, a tentative decision unit 25a takes in the filtered received signal output by the filter unit 21. The tentative decision unit 25a stores a decision threshold in advance in an internal storage region. The tentative decision unit 25a takes in the optimum scale value r_opt output by the SN ratio estimation circuit 1a, and applies the optimum threshold change rate b_opt, which is the inverse of the optimum scale value r_opt, to the decision threshold stored in an internal storage region.

The tentative decision unit 25a makes a tentative decision on the symbols on the basis of the filtered received signal that has been taken in and the decision threshold to which the optimum threshold change rate b_opt has been applied, and outputs a tentative decision signal including a symbol sequence, which is the result of the tentative decision.

Note that in FIG. 20, the SN ratio estimation circuit 1c of the fourth embodiment may be applied instead of the SN ratio estimation circuit 1a of the second embodiment.

Simulation Results

Figure 21:
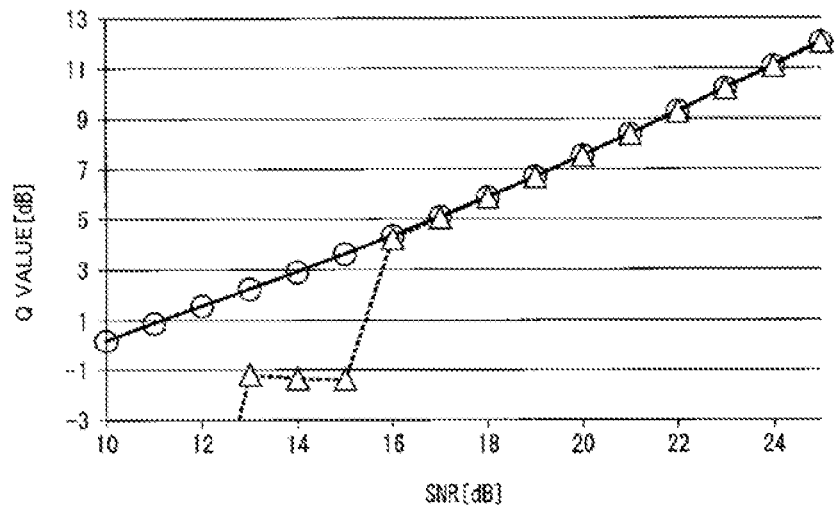
FIG. 21 is a diagram illustrating a graph indicating simulation results (No. 1).
Figure 22:
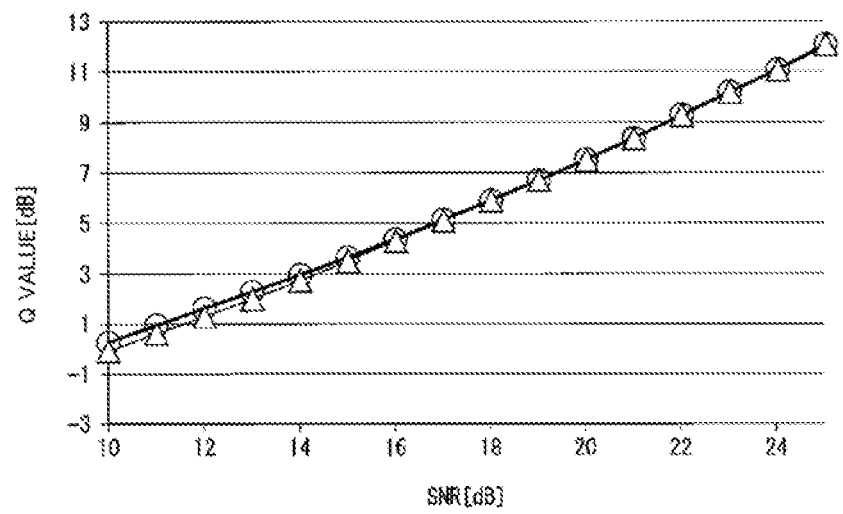
FIG. 22 is a diagram illustrating a graph indicating simulation results (No. 2).

FIG. 21 and FIG. 22 are graphs showing simulation results when 64QAM is applied as the modulation method. In FIG. 21 and FIG. 22, the horizontal axis represents the SN ratio (in units of dB), and the vertical axis represents a signal quality Q value (in units of dB). FIG. 21 illustrates a case where the step size, which is a parameter related to the convergence speed of the filter coefficients, is set to $1\times10^{-2}$. In contrast, FIG. 22 illustrates a case where the step size is set to $1\times10^{-5}$.

In FIGS. 21 and 22, the solid lines are graphs representing theoretical values, the plotted points with black triangles represent simulation results of a conventional method, and the plotted points with white circles represent simulation results when, for example, the adaptive filter circuits 2, 2a, 2b, and 2c of the fifth to eighth embodiments, the adaptive filter circuit 3 illustrated in FIG. 19, or the adaptive filter circuit 3a illustrated in FIG. 20, which are the proposed methods, are applied.

When the step size in FIG. 22 is small, there is no difference in characteristics between the theoretical values, the conventional method, and the proposed methods. In contrast, when the step size in FIG. 21 is large, the proposed methods can provide characteristics according to the theoretical values, while the conventional method shows a dramatic drop in characteristics due to misconvergence when the SN ratio is around 13 [dB] to 15 [dB]. Therefore, it can be seen that applying the proposed methods makes it possible to prevent error in the tentative decision in low SN ratio ranges, even if a large step size is used in the filter coefficient updating unit 23. Accordingly, the proposed method makes it possible to prevent divergence in the filter coefficients in the low SN ratio ranges, which makes it possible to increase the convergence speed of the filter coefficients.

Note that in the foregoing fifth to eighth embodiments, the processes of step Sd4-1 and step Sd4-2 indicated in FIG. 12 and the processes of step Sf4-1 and step Sf4-2 indicated in FIG. 16 are processes performed in parallel by the tentative decision unit 12 outputting the tentative decision signal. Additionally, the processes of step Se3-1 and step Se3-2 indicated in FIG. 14 and the processes of step Sg3-1 and step Sg3-2 indicated in FIG. 18 are processes performed in parallel by the tentative decision unit 12a outputting the tentative decision signal.

In the configurations of the foregoing first to eighth embodiments, the processes indicated shown in step S4 of FIG. 2, step Sa3 of FIG. 4, step Sb4 of FIG. 8, step Sc3 of FIG. 10, step Sd5 of FIG. 12, step Se4 of FIG. 14, step Sf5 of FIG. 16, and step Sg4 of FIG. 18 are processes of "decided whether or not smaller than target ratio", i.e., "decided whether or not less than target ratio", and "decided whether or not error is within permissible range", i.e., "deciding whether or not error is less than permissible value for error". However, the present invention is not limited to the stated embodiments, and processes of deciding "whether or not exceeding", "whether or not less than", "whether or not greater than or equal to", and "whether or not less than or equal to" are merely examples; these may be replaced with "whether or not greater than or equal to", "whether or not less than or equal to", "whether or not exceeding", and "whether or not less than", respectively, according to how the target ratio, which is the threshold, the permissible value of the error, or the like is determined. The threshold used in the decision process is also an example, and different thresholds may be applied for each case.

The SN ratio estimation circuits 1, 1a, 1b, and 1c, the adaptive filter circuits 2, 2a, 2b, and 2c, and the adaptive filter circuits 3 and 3a according to the foregoing embodiments may be implemented by a computer. In this case, a program for implementing the functions thereof may be recorded in a computer-readable recording medium, and the functions may be implemented by loading the program recorded in the recording medium into a computer system and executing the program. Here, "computer system" is assumed to include an OS, hardware such as peripheral devices, and the like. Additionally, "computer-readable recording medium" refers to a portable medium such as a flexible disk, a magneto-optical disk, ROM, a CD-ROM, or the like, or a storage device such as a hard disk which is built into the computer system. Furthermore, the "computer-readable recording medium" may also include a medium which holds the program for a set length of time, e.g., a medium that holds a program dynamically for a short period of time, such as a communication line in the case of transmitting a program over a network such as the Internet or a communication line such as a telephone line, or volatile memory within the computer system that serves as a server or client in such a case. The stated program may implement only some of the above-described functions, and may further be capable of implementing the above-described functions in combination with programs already recorded in the computer system, or may be implemented using a programmable logic device such as an FPGA (Field Programmable Gate Array).

Although embodiments of this invention have been described in detail above with reference to the drawings, the specific configuration is not limited to the embodiment, and designs and the like within the scope of the present invention are included.

INDUSTRIAL APPLICABILITY

The SN ratio estimation circuits 1, 1a, 1b, and 1c, the adaptive filter circuits 2, 2a, 2b, and 2c, and the adaptive filter circuits 3 and 3a can be applied in, for example, a digital coherent optical reception device.

REFERENCE SIGNS LIST

1 SN ratio estimation circuit
12 Tentative decision unit
13 Updating unit
14 SN ratio calculation unit
130 Scale unit
131 Average power calculation unit
132 Decision unit
133 Update computation unit

The invention claimed is:

1. An SN ratio estimation circuit, comprising:
a tentative decision unit that makes a tentative decision for symbols on the basis of a received signal and a decision threshold, and outputs a tentative decision signal including a sequence of the symbols;
an updating unit that updates a scale value indicating a rate of increase or reduction of the received signal or updates a threshold change rate indicating a degree of change in the decision threshold so that an appearance frequency of each of symbols included in the tentative decision signal output by the tentative decision unit matches an appearance frequency of each of symbols in a reference signal obtained by modulating a transmitted signal with a modulation method used in transmission, the modulation method being shared between a transmitting side and a receiving side, and that outputs an instruction signal indicating an instruction to calculate an SN ratio of the received signal when a degree of agreement between the appearance frequencies is within a predetermined permissible range; and an SN ratio calculation unit that, when the instruction signal output by the updating unit is received, calculates an SN ratio using the scale value when the instruction signal is received or using the threshold change rate when the instruction signal is received, wherein when the scale value has been updated by the updating unit, the tentative decision unit makes a tentative decision for the symbols on the basis of the received signal increased or reduced by the scale value that has been updated and the decision threshold, and when the threshold change rate has been updated by the updating unit, the tentative decision unit makes a tentative decision for the symbols on the basis of the received signal and the decision threshold to which the threshold change rate that has been updated is applied.

2. The SN ratio estimation circuit according to claim 1, wherein the updating unit includes:

an average power calculation unit that calculates an average power value of the tentative decision signal output by the tentative decision unit;

a decision unit that decides whether or not the degree of agreement between the appearance frequencies is within the predetermined permissible range on the basis of a target power value calculated from the appearance frequency of each symbol in the reference signal and the average power value, and outputs the instruction signal to the SN ratio calculation unit when it is decided that the degree of agreement is within the permissible range; and an update computation unit that updates the scale value or updates the threshold change rate on the basis of the target power value and the average power value when the decision unit decides that the degree of agreement is not within the permissible range.

3. The SN ratio estimation circuit according to claim 1, wherein the updating unit includes:

a histogram generation unit that generates a histogram indicating the appearance frequency for each symbol included in the tentative decision signal output by the tentative decision unit;

a decision unit that, on the basis of error between a histogram of the appearance frequency of each symbol in the reference signal and the histogram generated by the histogram generation unit, decides whether or not the degree of agreement between the appearance frequencies is within a predetermined permissible range, and when it is decided that the degree of agreement is within the permissible range, outputs the instruction signal to the SN ratio calculation unit; and an update computation unit that updates the scale value or updates the threshold change rate so as to reduce the error when the decision unit decides that the degree of agreement is not within the permissible range.

4. An adaptive filter circuit, comprising:

a filter unit that filters a received signal on the basis of a filter coefficient;

a tentative decision unit that makes a tentative decision for symbols on the basis of the received signal that has been filtered and a decision threshold, and outputs a tentative decision signal including a sequence of the symbols;

an updating unit that updates a scale value indicating a rate of increase or reduction of the received signal that has been filtered or updates a threshold change rate indicating a degree of change in the decision threshold so that an appearance frequency of each of the symbols included in the tentative decision signal output by the tentative decision unit matches an appearance frequency of each of symbols in a reference signal obtained by modulating a transmitted signal with a modulation method used in transmission, the modulation method being shared between a transmitting side and a receiving side; and a filter coefficient updating unit that, on the basis of the received signal, the received signal that has been filtered, and the tentative decision signal output by the tentative decision unit, calculates an update value for the filter coefficient, and provides the update value for the filter coefficient that has been calculated to the filter unit, wherein when the scale value is updated by the updating unit, the tentative decision unit makes a tentative decision for the symbols on the basis of the received signal that has been filtered and has been increased or reduced by the scale value that has been updated, and the decision threshold, and when the threshold change rate has been updated by the updating unit, the tentative decision unit makes a tentative decision for the symbols on the basis of the received signal that has been filtered and the decision threshold to which the threshold change rate that has been updated is applied.

5. The adaptive filter circuit according to claim 4, wherein the updating unit includes:

an average power calculation unit that calculates an average power value of the tentative decision signal output by the tentative decision unit;

a decision unit that decides whether or not a degree of agreement between the appearance frequencies is within a predetermined permissible range on the basis of a target power value calculated from the appearance frequency of each of the symbols in the reference signal and the average power value; and an update computation unit that updates the scale value or updates the threshold change rate on the basis of the target power value and the average power value when the decision unit decides that the degree of agreement is not within the permissible range.

6. The adaptive filter circuit according to claim 4, wherein the updating unit includes:

a histogram generation unit that generates a histogram indicating the appearance frequency for each symbol included in the tentative decision signal output by the tentative decision unit;

a decision unit that, on the basis of error between a histogram of the appearance frequency for each of the symbols in the reference signal and the histogram generated by the histogram generation unit, decides whether or not the degree of agreement between the appearance frequencies is within the predetermined permissible range; and an update computation unit that updates the scale value or updates the threshold change rate so as to reduce the error when the decision unit decides that the degree of agreement is not within the permissible range.

7. An adaptive filter circuit, comprising:

a filter unit that filters a received signal on the basis of a filter coefficient;

a tentative decision unit that makes a tentative decision for symbols on the basis of the received signal that has been filtered and a decision threshold, and outputs a tentative decision signal including a sequence of the symbols; and a filter coefficient updating unit that, on the basis of the received signal, the received signal that has been filtered, and the tentative decision signal output by the tentative decision unit, calculates an update value for the filter coefficient, and provides the update value for the filter coefficient that has been calculated to the filter unit, wherein on the basis of the received signal that has been filtered and has been increased or reduced by the scale value used when the SN ratio estimation circuit according to claim 1 takes in the received signal that has been filtered instead of the received signal and calculates the SN ratio, and the decision threshold, or on the basis of the decision threshold to which the threshold change rate used when calculating the SN ratio is applied and the received signal that has been filtered, the tentative decision unit of the adaptive filter circuit makes a tentative decision for the symbols, and outputs a tentative decision signal including a sequence of the symbols.

* * * * *